(12) United States Patent
Gray et al.

(10) Patent No.: US 6,402,189 B1
(45) Date of Patent: Jun. 11, 2002

(54) AIRBAG DOOR AND METHOD FOR MAKING SAME

(75) Inventors: John D. Gray, Union, NH (US); Philip A. Bunn, South Woodham Ferrers (GB); Bas Korte, Troy, MI (US); Chris Hayes, South Woodham Ferrers (GB)

(73) Assignee: Textron Automotive Company, Inc, Troy, MI (US)

( * ) Notice: Subject to any disclaimer, the term of this patent is extended or adjusted under 35 U.S.C. 154(b) by 0 days.

(21) Appl. No.: 09/504,398

(22) Filed: Feb. 15, 2000

(51) Int. Cl.[7] ............................................. B60R 21/20
(52) U.S. Cl. .................................... 280/728.3; 280/732
(58) Field of Search ............................. 280/728.3, 732, 280/731, 728.1

(56) References Cited

U.S. PATENT DOCUMENTS

| 4,120,516 | A | | 10/1978 | Takamatsu et al. | 280/728 |
|---|---|---|---|---|---|
| 4,148,503 | A | * | 4/1979 | Shiratori et al. | 280/731 |
| 4,246,213 | A | | 1/1981 | Takamatsu et al. | 264/46.7 |
| 4,903,986 | A | | 2/1990 | Cok et al. | 280/728 |
| 4,989,895 | A | | 2/1991 | Pearson et al. | 280/731 |
| 5,013,064 | A | | 5/1991 | Miller et al. | 280/730 |
| 5,060,971 | A | | 10/1991 | Nanbu et al. | 280/728 |
| 5,072,967 | A | | 12/1991 | Batchelder et al. | 280/732 |
| 5,080,393 | A | * | 1/1992 | Dixon, Jr. et al. | 280/732 |
| 5,082,310 | A | * | 1/1992 | Bauer | 280/732 |
| 5,096,220 | A | | 3/1992 | Nakajima | 280/728 |
| 5,110,647 | A | | 5/1992 | Sawada et al. | 428/43 |
| 5,131,678 | A | * | 7/1992 | Gardner et al. | 280/732 |
| 5,143,401 | A | | 9/1992 | Zushi | 280/731 |
| 5,152,548 | A | | 10/1992 | Zushi | 280/728 |
| 5,154,444 | A | | 10/1992 | Nelson | 280/732 |
| 5,172,931 | A | | 12/1992 | Baba et al. | 280/728 |
| 5,172,932 | A | | 12/1992 | Watanabe et al. | 280/731 |
| 5,174,602 | A | | 12/1992 | Nakayama et al. | 280/743 |
| 5,195,773 | A | | 3/1993 | Sawada et al. | 280/728 |
| 5,222,760 | A | * | 6/1993 | Rafferty | 280/728 |
| 5,292,150 | A | | 3/1994 | Watanabe et al. | 280/728 B |
| 5,316,335 | A | | 5/1994 | Gray et al. | 280/728 B |
| 5,316,822 | A | | 5/1994 | Nishijima et al. | 428/138 |
| 5,346,249 | A | | 9/1994 | Hallard et al. | 280/728 |
| 5,372,379 | A | * | 12/1994 | Parker | 280/728 |
| 5,375,874 | A | | 12/1994 | Zushi | 280/728 |

(List continued on next page.)

FOREIGN PATENT DOCUMENTS

| DE | 41 15913 A1 | 11/1991 | B60R/21/20 |
|---|---|---|---|
| DE | 42 41 728 A1 | 6/1993 | B60R/21/20 |
| DE | 198 19 573 A1 | 11/1998 | B60R/21/16 |
| DE | 198 00 815 C1 | 2/1999 | B23K/26/00 |
| EP | 0 428 935 A2 | 5/1991 | B60R/21/20 |
| EP | 0 819 584 A2 | 1/1998 | B60R/21/20 |
| EP | 0 846 068 B1 | 9/1999 | B60R/21/20 |
| GB | 2 244 243 A | 11/1991 | |
| JP | 2-99324 | 4/1990 | B32B/7/04 |

*Primary Examiner*—J. J. Swann
*Assistant Examiner*—J. Allen Shriver
(74) *Attorney, Agent, or Firm*—Grossman, Tucker, Perreault and Pfleger, PLLC

(57) ABSTRACT

An airbag door system is provided comprising a substrate, an outer shell and a foam where all three layers possess a line of mechanical weakness with each line of mechanical weakness at least partially separating each layer into an airbag door portion and a trim member portion. The substrate line of mechanical weakness comprises at least one substrate aperture. The outer shell line of mechanical weakness comprises an outer shell reduced thickness portion defined by an outer shell sever extending partially through an outer shell thickness from an outer shell lower surface towards an outer shell upper surface. The foam line of mechanical weakness comprises a foam reduced thickness portion defined by a foam sever extending partially through a foam thickness from a foam lower surface towards a foam upper surface. The outer shell line of mechanical weakness is displaced relative to a foam line of mechanical weakness.

24 Claims, 18 Drawing Sheets

U.S. PATENT DOCUMENTS

| | | | | |
|---|---|---|---|---|
| 5,378,014 A | * | 1/1995 | Cooper | 280/728 |
| 5,390,950 A | * | 2/1995 | Barnes et al. | 280/728 |
| 5,393,088 A | | 2/1995 | Bauer et al. | 280/728 |
| 5,437,470 A | | 8/1995 | Terai et al. | 280/728 |
| 5,447,327 A | | 9/1995 | Jarboe et al. | 280/728.3 |
| 5,447,328 A | * | 9/1995 | Iannazzi et al. | 280/728.3 |
| 5,456,490 A | | 10/1995 | Carter et al. | 280/728.3 |
| 5,484,561 A | | 1/1996 | Weber et al. | 264/46.4 |
| 5,487,558 A | * | 1/1996 | Ball et al. | 280/728.3 |
| 5,536,037 A | * | 7/1996 | Cherry | 280/728.3 |
| 5,544,912 A | * | 8/1996 | Sommer | 280/728.3 |
| 5,564,733 A | | 10/1996 | Duenas et al. | 280/728.3 |
| 5,590,903 A | * | 1/1997 | Phillion et al. | 280/728.3 |
| 5,626,357 A | * | 5/1997 | Leonard et al. | 280/728.3 |
| 5,641,177 A | * | 6/1997 | Berg et al. | 280/728.3 |
| 5,772,240 A | | 6/1998 | Vavalidis | 280/728.3 |
| 5,775,727 A | * | 7/1998 | Sun et al. | 280/728.3 |
| 5,797,619 A | | 8/1998 | Bauer et al. | 280/728.3 |
| 5,810,388 A | | 9/1998 | Berardi et al. | 280/728.3 |
| 5,863,062 A | * | 1/1999 | Harada et al. | 280/728.3 |
| 5,863,064 A | | 1/1999 | Rheinlander et al. | 280/732 |
| 5,961,143 A | | 10/1999 | Hlywka et al. | |
| 6,065,771 A | * | 5/2000 | Kawakubo et al. | 280/728.3 |
| 6,070,901 A | | 6/2000 | Hazell et al. | |

* cited by examiner

AIRBAG DOOR AND METHOD FOR MAKING SAME

TECHNICAL FIELD OF THE INVENTION

The present invention relates generally to automotive airbag doors which are intended to be concealed from the view of a vehicle occupant prior to deployment.

BACKGROUND OF THE INVENTION

It is known to manufacture automotive instrument panels containing airbag doors which are concealed from the view of a vehicle occupant prior to deployment. Such concealed airbag doors are often characterized by the non-existence of any definitive seam, styling line, gap, or similar feature between the airbag door and instrument panel outer surfaces which would indicate the airbag door's presence. An example of such a structure is described in U.S. Pat. No. 5,810,388. The '388 Patent describes a method of manufacturing an automotive instrument panel that conceals an airbag door. The steps of manufacturing the instrument panel include providing a molded substrate having first and second surfaces and an aperture therethough, and a metal door having a generally U-shaped slot secured to the second surface of the substrate with a plurality of attaching posts. The slot has first and second ends being spaced apart a distance greater than the length of the aperture. The slot defines a flap in the door. The flap has a width greater than the width of the aperture. The door and substrate assembly is placed within a mold tool and a pre-molded covering is juxtaposed the substrate. A quantity of foam is injected between the substrate and covering and secures the covering to the substrate.

Recently, certain automobile manufactures have implemented airbag door test criteria limiting the amount of fragmentation upon deployment. Fragmentation generally refers to those portions of the airbag door, instrument panel or their surrounding structures which may become separated from their respective components upon airbag deployment and subsequently enter into the vehicle occupant compartment, possibly at the risk of injury to a vehicle occupant. More specifically, some automobile manufactures have sought to limit the possibility of foam fragmentation occurring upon airbag deployment. The '388 Patent does not provide a structure for reduced levels of foam fragmentation or a method for such.

In addition, it has become desirable to develop airbag doors with increased stiffness in order to reduce airbag door bending and distortion during deployment and, more particularly, the associated deployment force and energy losses occuring with such bending and distortion. Such increases in airbag door stiffness result in increased transmission efficiency of airbag deployment forces in separating the airbag door from its trim member, in this case an instrument panel. More particularly, airbag doors with increased stiffness tend to deploy in a more uniform and efficient manner given better transmission of deployment forces in a more even array. While the '388 Patent provides for some increased stiffness of the airbag door by virtue of indentations of the metal door, it has been found that additional stiffness and resistance to bending is preferred in certain instances. This has been particularly evident with the use of so called "second generation", "depowered" or "dual stage" airbag systems. Such systems are designed to emit lower energy levels and associated deployment forces upon the detection of an out-of-position vehicle occupant than the previous first generation systems. In such an instance, it has been found that airbag doors with increased stiffness and transmission efficiency of deployment forces are desired for better operation of the airbag system and, more particularly, separation of the airbag door from its trim member with reduced fragmentation.

In addition, it has become desirable to develop trim member substrates and, in particular, instrument panel substrates with a reduced possibility of fragmentation occuring, but still using the same low cost materials. It has been found that fragmentation from the instrument panel substrate is more apt to occur closer to the airbag door area than from other areas of the instrument panel. The '388 Patent does not provide a structure for reduced levels of such substrate fragmentation or a method for such.

SUMMARY OF THE INVENTION

Accordingly, the present invention provides a structure and method to provide an improved airbag door system for reduced levels of foam and substrate fragmentation.

According to one feature of the invention, an airbag door system is provided comprising a substrate, an outer shell and a foam where all three layers possess a line of mechanical weakness with each line of mechanical weakness at least partially separating each layer into an airbag door portion and a trim member portion.

According to another feature of the invention, a substrate line of mechanical weakness comprises at least one substrate aperture.

According to another feature of the invention, an outer shell line of mechanical weakness comprises an outer shell reduced thickness portion defined by an outer shell sever extending partially through an outer shell thickness from an outer shell lower surface towards an outer shell upper surface.

According to another feature of the invention, a foam line of mechanical weakness comprises a foam reduced thickness portion defined by a foam sever extending partially through a foam thickness from a foam lower surface towards a foam upper surface.

According to another feature of the invention, an outer shell line of mechanical weakness is displaced relative to a foam line of mechanical weakness.

According to another feature of the invention, an outer shell line of mechanical weakness is displaced relative to a substrate line of mechanical weakness.

According to another feature of the invention, an outer shell sever at the outer shell lower surface is in direct contact with a foam upper surface.

According to another feature of the invention, an outer shell sever comprises first and second outer shell sever surfaces where the outer shell sever is sufficiently narrow such that at least a portion of the first and second outer shell sever surfaces are in direct contact with one another after the outer shell sever is formed.

According to another feature of the invention, an outer shell sever comprises first and second outer shell sever surfaces where the outer shell sever is sufficiently narrow such that at least a portion of the first and second outer shell sever surfaces are in direct contact with one another after a foam is formed.

According to another feature of the invention, an outer shell sever comprises first and second outer shell sever surfaces where the outer shell sever is sufficiently narrow such that a foam is not in direct contact with at least a portion of either the first or second outer shell sever surfaces.

According to another feature of the invention, an outer shell sever comprises first and second outer shell sever surfaces where the outer shell sever is sufficiently narrow such that a foam does not occupy at least a portion of the outer shell sever.

According to another feature of the invention, an outer shell sever is continuous or discontinuous.

According to another feature of the invention, a discontinuous outer shell sever comprises a plurality of holes, which may further comprise through holes or blind holes.

According to another feature of the invention, an outer shell sever is perpendicular or other than perpendicular to an outer shell lower surface.

According to another feature of the invention, an outer shell sever comprises an outer shell sever depth between 5% and 95% of an outer shell thickness.

According to another feature of the invention, an outer shell reduced thickness portion is between 5% and 95% of an outer shell thickness.

According to another feature of the invention, a foam sever comprises first and second foam sever surfaces where the foam sever is sufficiently narrow such that at least a portion of the first and second foam sever surfaces are in direct contact with one another after the foam sever is formed.

According to another feature of the invention, a foam sever is continuous or discontinuous.

According to another feature of the invention, a discontinuous foam sever comprises a plurality of slots.

According to another feature of the invention, a foam sever is perpendicular or other than perpendicular to a foam lower surface.

According to another feature of the invention, a foam sever comprises a foam sever depth between 12.5% and 96.7% of a foam thickness.

According to another feature of the invention, a foam reduced thickness potion is between 3.3% and 87.5% of a foam thickness.

According to another feature of the invention, a substrate aperture is elongated.

According to another feature of the invention, a substrate aperture comprises a substrate aperture length and a substrate aperture width where the substrate aperture length is greater than the substrate aperture width.

According to another feature of the invention, a substrate aperture comprises a substrate aperture length and a substrate aperture width where the substrate aperture length is greater than or equal to four times the substrate aperture width.

According to another feature of the invention, a substrate aperture comprises a rectangle shape, an oval shape, a hexagon shape or a trapezoid shape.

According to another feature of the invention, a substrate aperture terminates in a tear stop.

According to another feature of the invention, an airbag door substrate portion and trim member substrate portion are linked by at least one substrate bridge.

According to another feature of the invention, a substrate bridge is formed at the same time and from the same material as an airbag door substrate portion or a trim member substrate portion.

According to another feature of the invention, a substrate bridge reduces independent movement of an airbag door substrate portion relative to a trim member substrate portion prior to an airbag deployment.

According to another feature of the invention, a substrate bridge breaks during an airbag deployment to permit an airbag door substrate portion to move independent of a trim member substrate portion.

According to another feature of the invention, a substrate bridge comprises a substrate bridge width where the substrate bridge width is equal to or greater than a substrate aperture width.

According to another feature of the invention, a substrate bridge comprises a substrate bridge length where the substrate bridge length is no greater than 10.0 mm.

According to another feature of the invention, a substrate bridge comprises a substrate bridge cross-sectional thickness and a substrate bridge width where the substrate bridge cross-sectional thickness across the substrate bridge width is constant.

According to another feature of the invention, a substrate bridge comprises a substrate bridge cross-sectional thickness and a substrate bridge width where the substrate bridge cross-sectional thickness across the substrate bridge width is variable.

According to another feature of the invention, a substrate bridge comprises a substrate bridge cross-sectional thickness and a substrate bridge width where the substrate bridge cross-sectional thickness across the substrate bridge width is equal to or less than a substrate thickness of an airbag door substrate portion or a trim member substrate portion.

According to another feature of the invention, a substrate bridge comprises a substrate bridge edge appearance where the substrate bridge edge appearance is U-shaped, V-shaped, or off-centered V-shaped.

According to another feature of the invention, an airbag door system further comprises a reinforcement member possessing a line of mechanical weakness at least partially separating the reinforcement member into an airbag door reinforcement member portion and trim member reinforcement member portion.

According to another feature of the invention, a reinforcement member line of mechanical weakness comprises at least one reinforcement member aperture.

According to another feature of the invention, at least a portion of an airbag door reinforcement member portion overlies at least a portion of an airbag door substrate portion to create a double material layer comprising a stiffness greater than the airbag door reinforcement member portion or the airbag door substrate portion individually.

According to another feature of the invention, at least a portion of a reinforcement member aperture and at least a portion of a substrate aperture overlie.

According to another feature of the invention, at least a portion of a trim member reinforcement member portion overlies at least a portion of a trim member substrate portion to an edge of said trim member substrate portion adjacent said substrate aperture.

According to another feature of the invention, the trim member reinforcement member portion comprises a ring.

According to another feature of the invention, the trim member reinforcement member portion comprises a closed ring.

According to another feature of the invention, at least a portion of a reinforcement member lower surface and a substrate upper surface are separated by tape.

According to another feature of the invention, at least a portion of a reinforcement member lower surface and a substrate upper surface are separated by a polymer film.

According to another feature of the invention, a polymer film further comprises two surfaces and an adhesive applied to both of the surfaces where the adhesive bonds a reinforcement member lower surface to a substrate upper surface.

According to another feature of the invention, at least a portion of said reinforcement member lower surface and said substrate upper surface are adhesively bonded.

According to another feature of the invention an airbag door system further comprises an airbag canister housing.

According to another feature of the invention, at least a portion of the airbag canister housing upper surface and the substrate lower surface are adhesively bonded.

BRIEF DESCRIPTION OF THE DRAWINGS

To better understand and appreciate the invention, refer to the following detailed description in connection with the accompanying drawings.

DETAILED DESCRIPTION OF THE INVENTION

Figure 1:
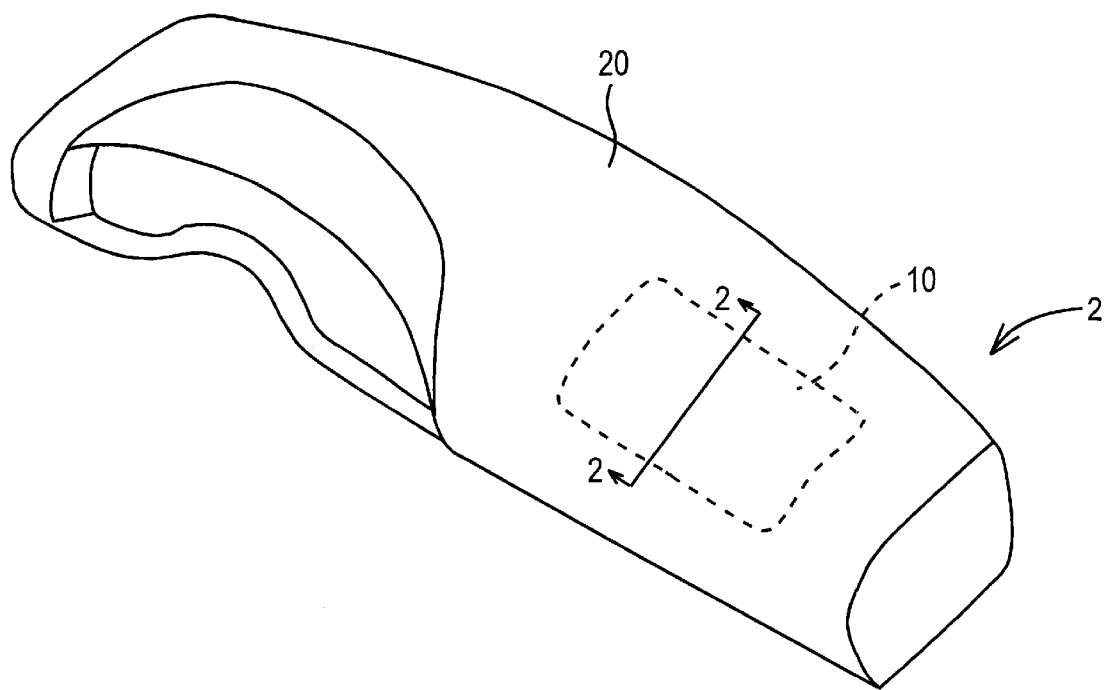
FIG. 1 is a perspective view of an airbag door system constructed according to the present invention and installed in an instrument panel.

FIG. 1 illustrates an airbag door system 2 comprising a concealed airbag door 10 and an trim member 20 shown as an instrument panel. As shown, preferably the airbag door 10 is rectangular and comprises a single airbag door in a top mount position disposed within the confines of the trim member 20. However, it is noted that the shape, number of doors, and location of the airbag door 10 is merely preferred and not considered limitive of the invention. In other words, for example, the airbag door 10 may be circular, oval, elliptical, rectangular, square, trapezoidal, trapezium, or any other geometric shape. The airbag door 10 may comprise one, two, or more doors depending on whether the deployment pattern is that of a I, C, H, X, U or other configuration. The airbag door 10 may be incorporated in a mid-mount, low-mount, or other position. Also, the airbag door 10 may be incorporated in trim members other than instrument panels such as side-trim panels (e.g. door trim panels, quarter trim panels), headliners, consoles (e.g. overhead, center floor mount), package shelves, pillars, and seats.

Figure 2:
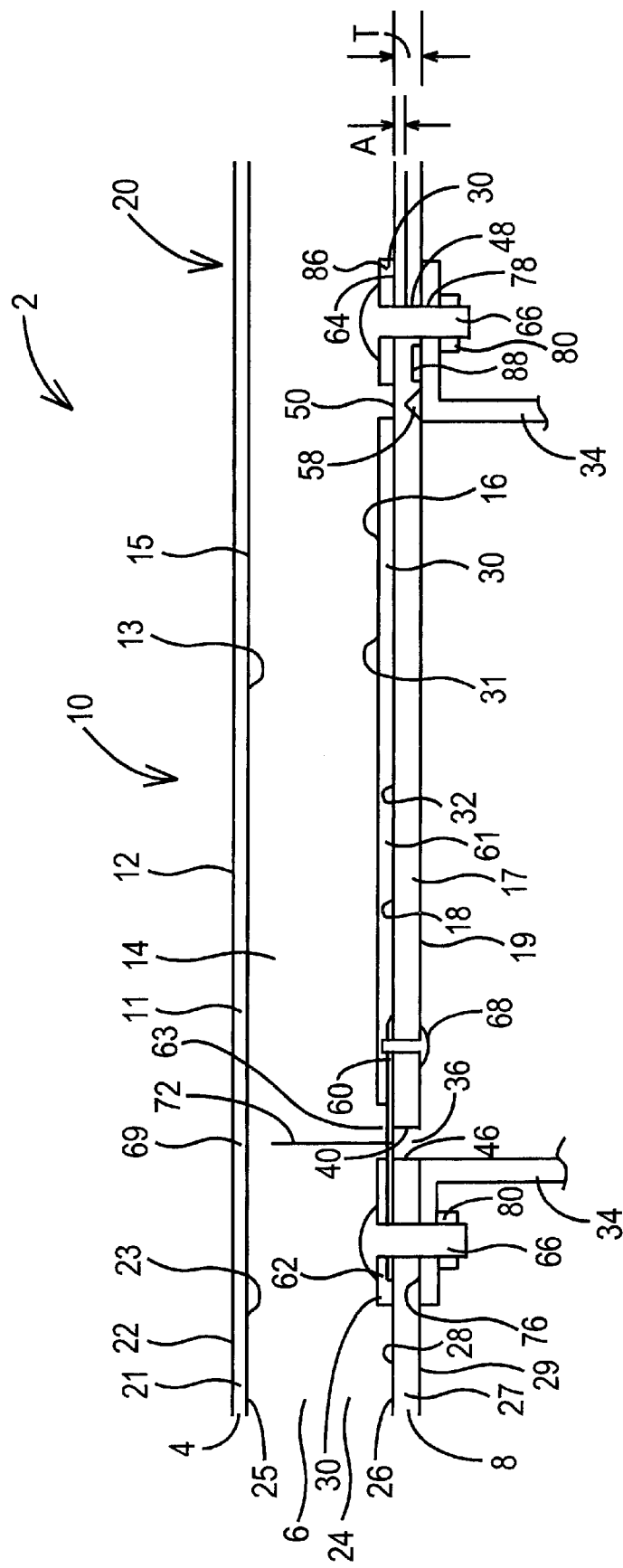
FIG. 2 is a cross-sectional view of the airbag door system of FIG. 1 taken along line 2—2 of FIG. 1.

As shown in FIG. 2, the general construction for the airbag door system 2 comprises outer shell 4, foam 6, and substrate 8. The outer shell 4, foam 6, and substrate 8 are further separated in airbag door 10 and trim member 20 portions. With regards to the outer shell 4, it is at least partially separated by partial shell sever 69 into outer shell 11 of airbag door 10 and outer shell 21 of trim member 20. With regards to the foam 6, it is at least partially separated by partial foam sever 72 into foam 14 of airbag door 10 and foam 24 of trim member 20. Lastly, with regards to the substrate, it is at least partially separated by substrate aperture 36 into airbag door substrate 17 and trim member substrate 27.

All three layers possess upper and lower surfaces. With respect to their orientation, upper surfaces 12, 22 of the outer shell 11, 21 are the surfaces viewed by a vehicle occupant. Generally, the lower surfaces 13, 23 of the outer shell 11, 21 are adjacent the upper surfaces 15, 25 of the foam 14, 24. With respect to foam 6, in the area of airbag door 10 lower surface 16 of the foam 14 is generally adjacent the upper surface 31 of reinforcement member 30 while the lower surface 32 of reinforcement member 30 is adjacent the upper surface 18 of the substrate 17. In the area of trim member 20, lower surface 26 of the foam 24 is generally adjacent the upper surface 28 of the substrate 27 while the lower surface 29 of the substrate 27 is adjacent airbag canister housing 34.

Having presented the general construction of the invention, the invention is presented below in further detail with regards to each of its component parts. The component parts of the invention are introduced to approximate order of manufacture to facilitate understanding of the invention.

As to the substrates, both the airbag door substrate 17 and trim member substrate 27 are preferably formed by injection molding. However, any suitable forming process may be used. This includes, but is not limited to, all forms of injection molding (e.g. high pressure, low pressure injection molding, injection compression, stamping, coining, gas-assist), compression molding, reaction injection molding, blow molding, thermoforming, and vac-forming.

Preferably, the airbag door substrate 17 and trim member substrate 27 are formed at a thickness in the range between and including 1.0 mm and 4.0 mm, and more preferably between and including 1.5 mm and 3.0 mm, and even more preferably 2.5 mm. Further, it should be understood that the thickness ranges identified above may be further subdivided into any 0.1 mm increment therebetween. Further, any suitable thickness outside the express ranges set forth above may also be used.

Preferably, the airbag door substrate 17 and trim member substrate 27 are formed at the same time (i.e. during the same forming or injection molding cycle) and from the same material. However, the airbag door substrate 17 may be formed separate from the trim member substrate 27 and subsequently joined thereto either during formation of the trim member substrate 27 or after formation of the trim member substrate 27. For example, the airbag door substrate 17 may be formed prior to formation of the trim member substrate 27 and subsequently inserted into an injection mold for the trim member substrate 27 for joining thereto during formation of the trim member substrate 27. Other processes may also include those described in U.S. Pat. Nos. 5,451,075; 5,456,490; 5,458,361; 5,560,646; 5,569,959; 5,618,485; 5,673,931; and 5,816,609 assigned to the assignee of the present invention, and incorporated herein by reference.

Preferably, the airbag door substrate 17 and trim member substrate 27 are formed using a polymer blend of polyphenylene oxide (PPO) and polystyrene (PS), and more preferably, General Electric's Noryl®. However, any suitable material may be used. This includes, but is not limited to, materials containing carbonates (e.g. PC, PC/ABS); olefins (e.g. PP, PE, TPO), styrenes (e.g. PS, SMA, ABS), esters, urethanes (e.g. PU), vinyls, (e.g. PVC), and rubbers (e.g. NR, EPDM).

Figure 3:
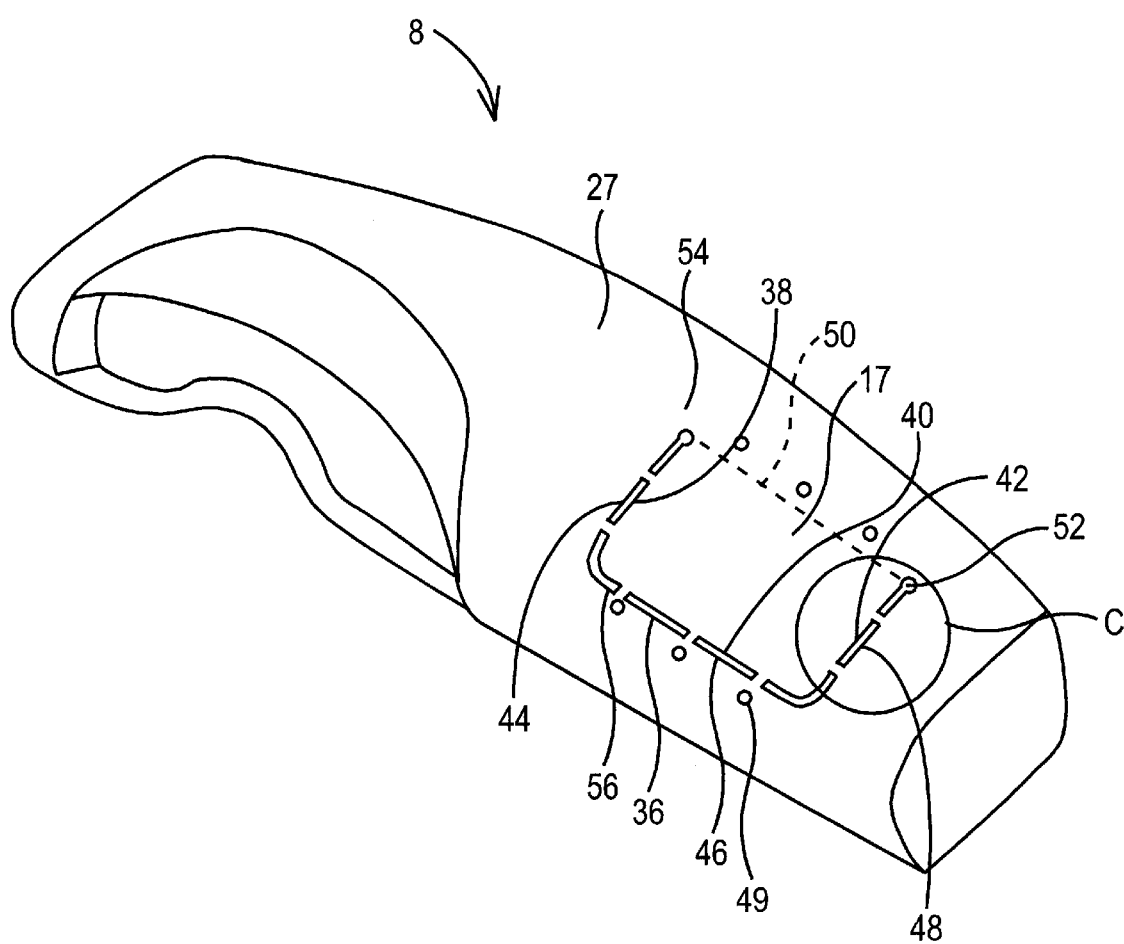
FIG. 3 is a perspective view of the substrate of the airbag door system of FIG. 1.

As shown in FIGS. 2 and 3, preferably the airbag door substrate 17 and trim member substrate 27 are separated by one or more apertures 36 which define a line of mechanical weakness in the substrate 8. More preferably, a plurality of apertures 36 exists and are arranged in a U-shaped pattern to create the preferred single, rectangular airbag door 10 discussed above. However, also as noted above, a single rectangular airbag door 10 is merely preferred and not considered limitive of the invention. Thus, the apertures 36 may be arranged in any pattern, including, but not limited to, that of the shape of a I, C, H, X, to facilitate the desired shape or number of airbag doors 10.

Figure 3A:
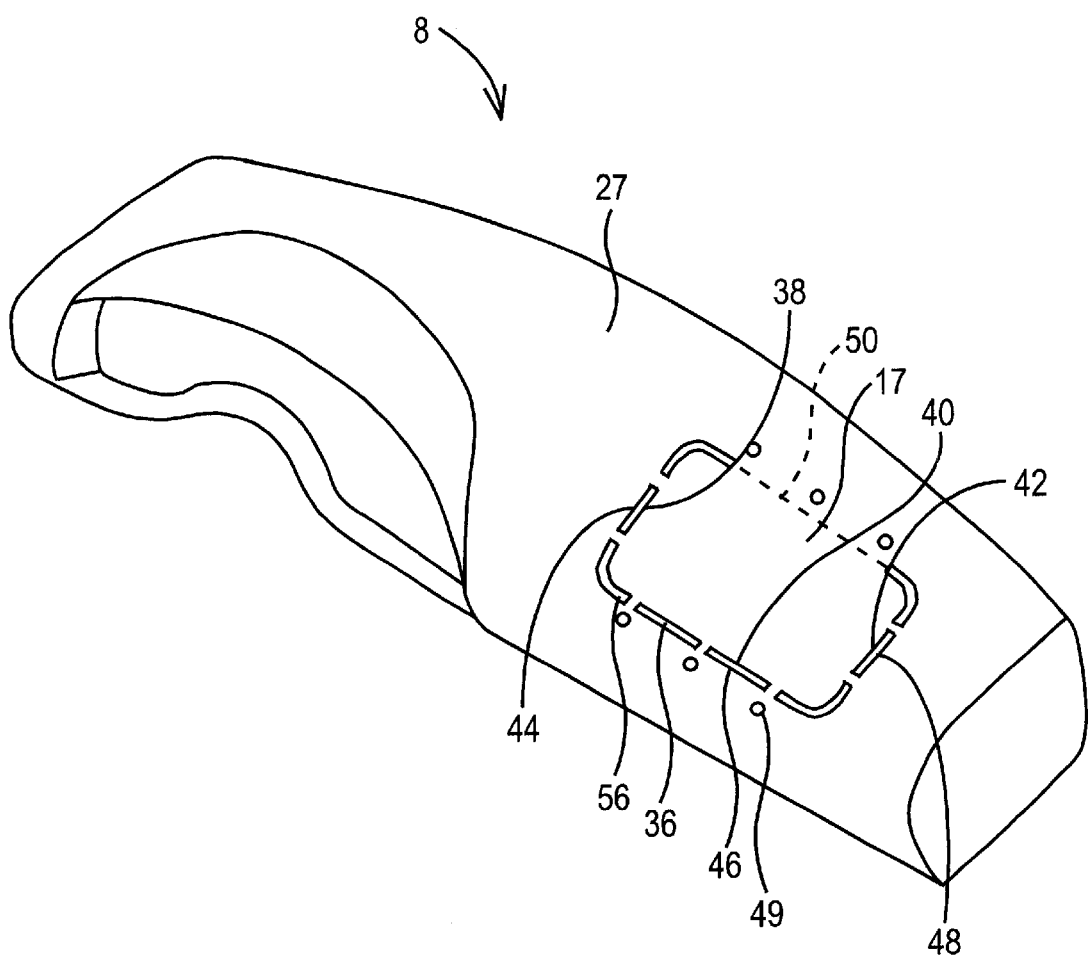
FIG. 3A is an alternative of the exploded view of the substrate and reinforcement member of the airbag door system of FIG. 1

Also as shown in FIG. 3, the plurality of apertures 36 define three sides of the airbag door substrate 17 at 38, 40, and 42. These three sides of the airbag door substrate 17 coincide with adjacent sides of the trim member substrate 27 at 44, 46, and 48 respectively. Preferably, a junction 50 defines a fourth side (located most forward in car position) between the airbag door substrate 17 and the trim member substrate 27. However, alternatively, as shown in FIG. 3A apertures 36 may also define at least a portion of the side defined by junction 50.

Figure 6:
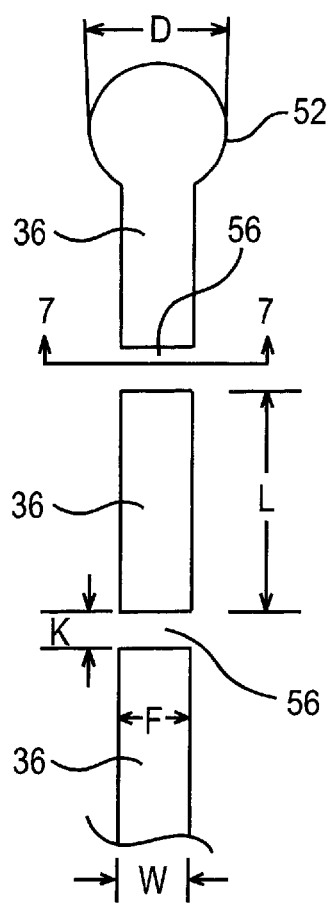
FIG. 6 is a first embodiment of an enlargement view taken from area C of FIG. 3.

As shown in FIG. 6, the apertures 36 are preferably elongated such that their length L is of greater value than their corresponding width W. More preferably, the length L of the aperture is greater than or equal to four times the width W of the aperture (i.e. $L \geq 4W$). Even more preferably, the length L of the aperture is greater than or equal to eight times the width W of the aperture (i.e. $L \geq 8W$). Even more preferably, the length L of the aperture is greater than or equal to sixteen times the width W of the aperture (i.e. $L > 16W$). Also as shown in FIG. 6, more preferably the apertures 36 are rectangular. More preferably, the length L of the rectangular aperture is 48.0 mm and the width W of the rectangular aperture is 3.0 mm. However, it is recognized that the apertures 36 may have a length L less equal to or of lesser value than their corresponding width W, for example as where the aperture is a square or a circle.

Figure 11:
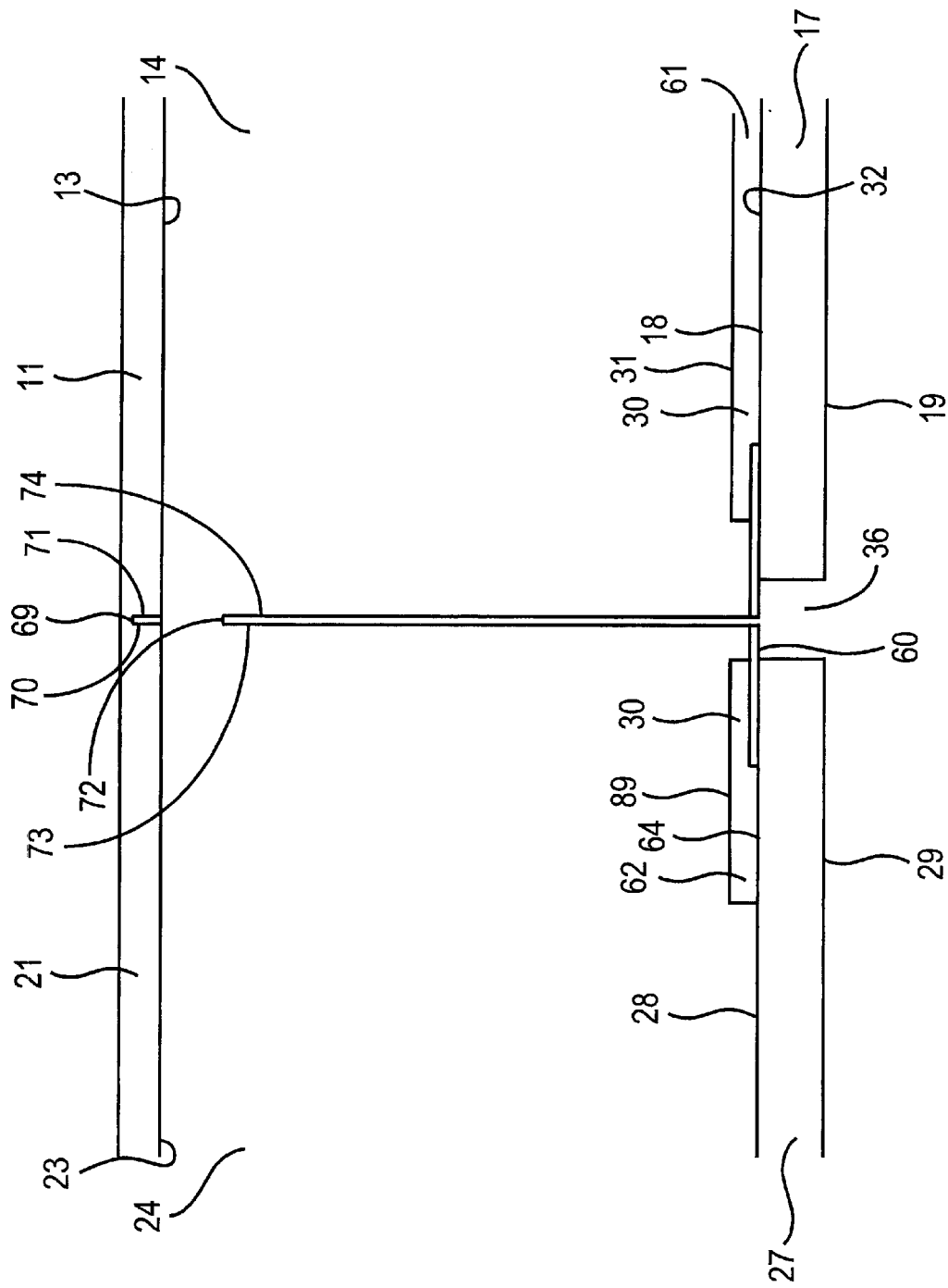
FIG. 11 is a cross-sectional enlargement view taken from FIG. 2.
Figure 16:
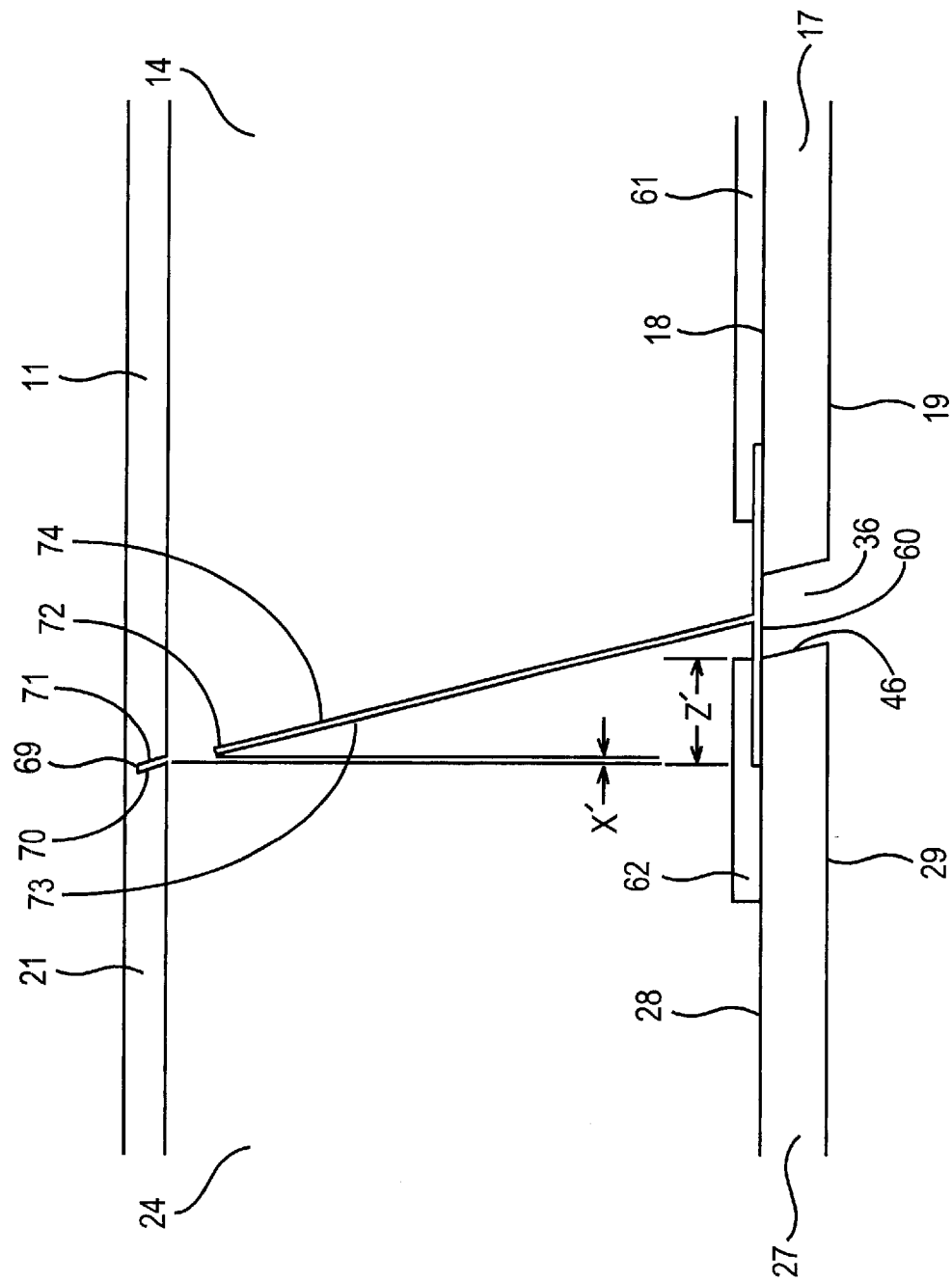
FIG. 16 is a cross-sectional enlargement view of a fourth embodiment.

As shown in FIGS. 2 and 11, apertures 36 are preferably formed perpendicular to the upper surfaces 18, 28 and lower surfaces 19, 29 of substrates 17, 27. However, as shown in FIG. 16, apertures 36 may be also formed at an angle other than perpendicular to any or all of the adjacent surfaces 18, 28, 19, 29 of the aperture 36. In certain instances, such may be required to accommodate the angle of die draw during molding of the substrate 8. With regards to determining whether apertures 36 are formed at an angle perpendicular or other than perpendicular to surfaces 18, 28, 19, 29, the angle is preferably measured with respect to the substrate adjacent aperture 36.

While FIG. 16 shows apertures 36, foam sever 72 and skin sever 69 still to be parallel to one another as the corresponding items in FIG. 2, it is recognized that any one of the three lines of mechanical weakness may exist at an angle different, and thus not parallel, to one another.

Also as shown in FIGS. 3 and 6, preferably, the aperture or plurality of apertures 36 terminate at each end thereof in tear stops 52 and 54. As shown in FIG. 6, preferably the tear stops 52 and 54 are round. More preferably, the diameter D of the tear stops 52 and 54 is greater than or equal to one times the width W of the aperture 36 (i.e. $D \geq W$). Even more preferably, the diameter D of the tear stops 52 and 54 is greater than or equal to one and one-half times the width W of the aperture 36 (i.e. $D \geq 1.5W$). Even more preferably, the diameter D of the tear stops 52 and 54 is greater than or equal to two times the width W of the aperture 36 (i.e. $D \geq 2W$). More preferably, the diameter D of the tear stops 52 and 54 is 6.0 mm and the width W of the aperture 36 is 3.0 mm.

As shown in FIGS. 3 and 6, where more than one aperture 36 is used, the apertures 36 are separated by bridges 56. Bridges 56 preferably link the airbag door substrate 17 and trim member substrate 27. The link between the airbag door substrate 17 and trim member substrate 27 is desired to reduce, and preferably prevent, the airbag door 10 from inward movement, or sagging, relative to the trim member 20 prior to airbag deployment. In order to link the airbag door substrate 17 and trim member substrate 27, the bridges 56 preferably have a width F equal to at least the width W of aperture 36. However, it is recognized that the width F of the bridges 56 may actually be of greater value than that of the width W of the aperture 36 such as where the bridges overlay a portion of the airbag door substrate 17 and/or a portion of the trim member substrate 27.

In addition to linking the airbag door substrate 17 and trim member substrate 27, preferably the bridges 56 are also integral portions with the airbag door substrate 17 and trim member substrate 27. More preferably, the bridges 56 are formed as unitary (i.e. formed at the same time and same material) portions with the airbag door substrate 17 and trim member substrate 27. More preferably, when bridges 56 are formed at the same time and same material as the airbag door substrate 17 and trim member substrate 27, they are also connected to the airbag door substrate 17 and trim member substrate 27. In this manner, bridges 56 can aid plastic flow between airbag door substrate 17 and trim member substrate 27 during substrate 17, 27 molding.

Preferably the link created between airbag door substrate 17 and trim member substrate 27 by bridges 56 is broken during airbag deployment allowing the airbag door substrate 17 to move independent of the trim member substrate 27. More preferably, as in the situation where the bridges 56 are formed with and connected to the airbag door substrate 17 and the trim member substrate 27, the bridges 56 themselves break upon airbag deployment.

As shown in FIGS. 7A–7D, the bridges 56 may be formed with a constant or varying cross-sectional thickness across their width F equal to or less than substrate thickness T. With regards to measuring substrate thickness T, where the substrate thickness is uniform the substrate thickness T is typically equal to the nominal substrate thickness. Alternatively, where the substrate thickness T may vary throughout the substrate, the substrate thickness T is preferably measured in an area of the substrate adjacent bridge 56.

Figure 7A:
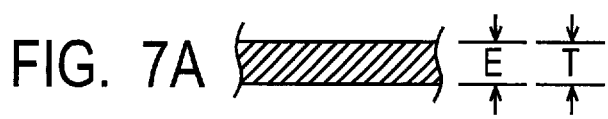
FIG. 7A is the first embodiment of a cross-sectional view taken along line 7—7 of FIG. 6.
Figure 7B:
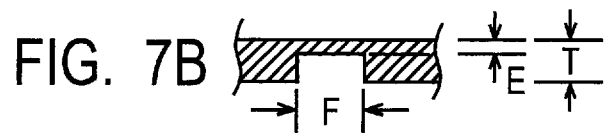
FIG. 7B is the second embodiment of a cross-sectional view taken along line 7—7 of FIG. 6.
Figure 7C:
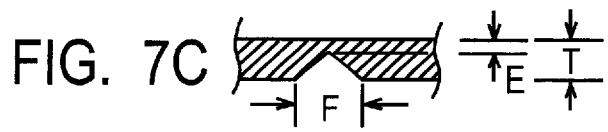
FIG. 7C is the third embodiment of a cross-sectional view taken along line 7—7 of FIG. 6.
Figure 7D:
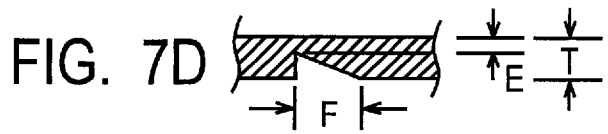
FIG. 7D is the fourth embodiment of a cross-sectional view taken along line 7—7 of FIG.6.

As shown in FIG. 7A, bridge 56 is shown to have a constant cross-sectional thickness E across its width F equal to the substrate thickness T. As shown in FIGS. 7B, bridge 56 is shown to also have a constant cross-sectional thickness across its width F with a minimum cross sectional thickness E less than the substrate thickness T. As shown in FIG. 7C and FIG. 7D, bridge 56 is shown to have a varying cross-sectional thickness across its width F with a minimum cross-sectional thickness E less than the substrate thickness T. FIG. 7C and FIG. 7D are differentiated by the fact that bridge 56 of FIG. 7C is symmetrical across its width F while bridge 56 of FIG. 7D is not symmetrical across its width F. Of the cross-sectional variations depicted in FIGS. 7A–7D, the bridge 56 depicted in FIG. 7A having a constant cross-sectional thickness E across its width F equal to the substrate thickness T is preferred to the variations of FIGS. 7B–7D due to its simpler profile complexity and easier moldability during forming of the substrates 17, 27.

In FIGS. 7B–7D, bridges 56 are formed with minimum cross sectional thickness E across their width F less than substrate thickness T. While not preferred, it is recognized that the bridges 56 may be formed with a cross-sectional thickness E equal to or greater than 10% of substrate thickness T (i.e. $E \geq 0.1T$). Preferably, cross sectional thickness E is equal to or greater than 50% of substrate thickness T (i.e. $E \geq 0.5T$), and more preferably cross sectional thickness E is equal to or greater than 75% of substrate thickness T (i.e. $E \geq 0.75T$) to facilitate proper forming during molding.

As shown in FIG. 6, bridges 56 also have a length K. Preferably, length K is no greater than 10.0 mm and more preferably no greater than 5.0 mm. Airbag deployment testing has shown that where a length K of the bridges 56 is greater than 5.0 mm, upon airbag deployment the bridges 56 tend to break less uniformly. More preferably, the bridges 56 have a length K of 1.0 mm to 5.0 mm and more preferably a length K of 2.0 mm to 4.0 mm. Even more preferably, the bridges 56 have a length K of 3.0 mm.

Figure 8:
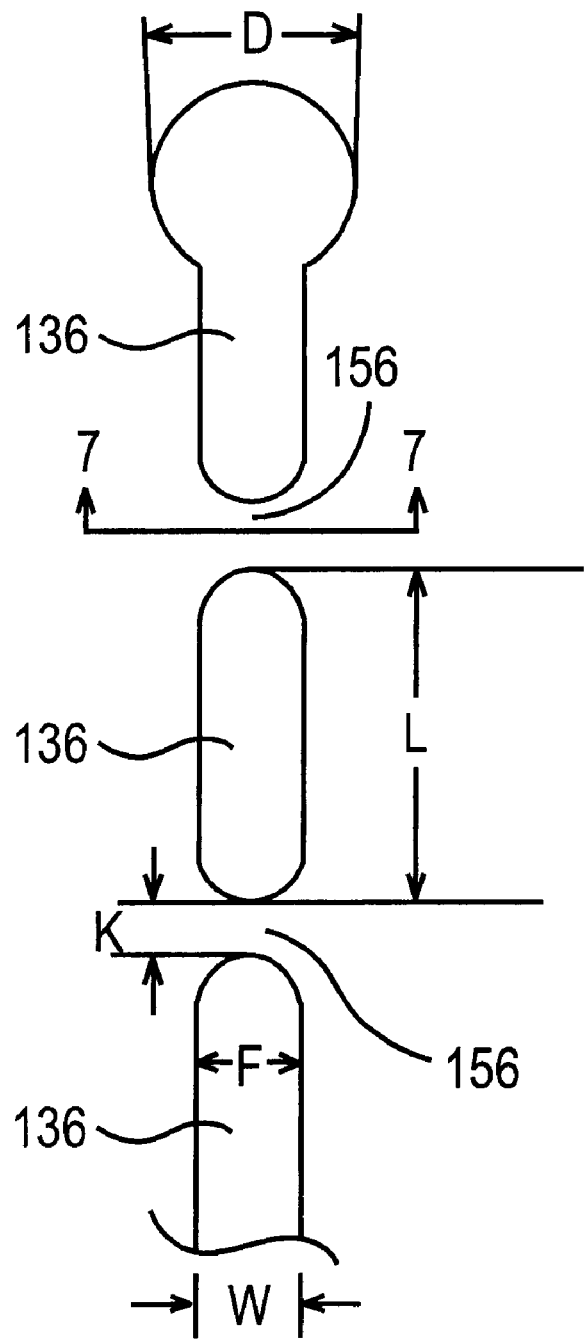
FIG. 8 is a second embodiment of an enlargement view taken along circle C of FIG.3.
Figure 9:
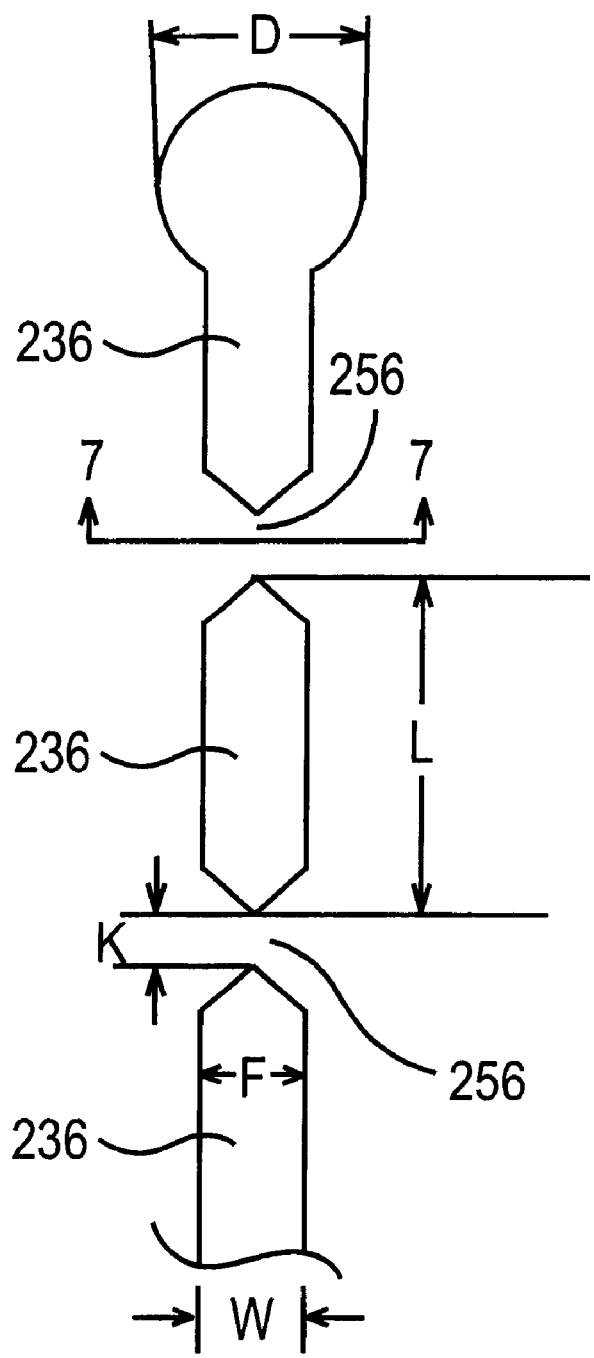
FIG. 9 is a third embodiment of an enlargement view taken along circle C of FIG. 3.
Figure 10:
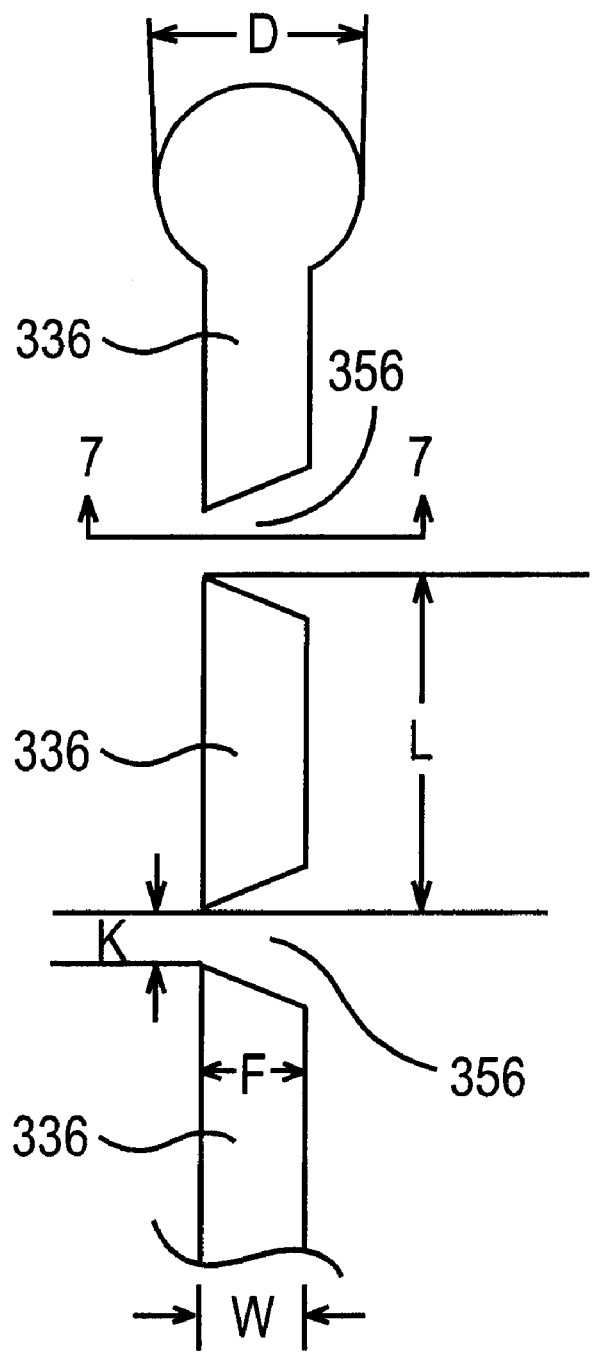
FIG. 10 is a fourth embodiment of an enlargement view taken along circle C of FIG.3.

In a second embodiment as shown in FIG. 8, the apertures 136 may transition into the bridges 156 in the form of a radii design resulting in bridges 156 with a U-shaped edge appearance across their width and oval apertures 136 therebetween. Alternatively, in a third embodiment as shown in FIG. 9, the apertures 236 may transition into the bridges 256 in the form of an arrow tip design resulting in bridges 256 with a V-shaped edge appearance across their width and hexagonal apertures 236 therebetween. Also, in a fourth embodiment as shown in FIG. 10, the apertures 336 may transition into the bridges 356 in the form of a trapezoidal design resulting in bridges 356 with an off-centered V-shaped edge appearance across their width and trapezoidal apertures 336 therebetween. Of these designs, the third and fourth embodiments are preferred to the second embodiment given the apertures terminate in a point upon which to concentrate the deployment force.

In other embodiments, while not illustrated, the bridges 56 may vary in cross-sectional thickness E, length K, and aperture length L from one bridge 56 to another bridge 56 as to effect airbag door opening during airbag deployment.

As shown in FIG. 3, similar to the apertures 36, preferably the junction 50 terminates along its length at tear stops 52 and 54. However, preferably the junction 50 does not include apertures 36 similar to the remaining three sides, but rather maintains airbag door substrate 17 and trim member substrate 27 in continual connection along its length between tear stops 52 and 54. Regardless of whether apertures 36 are used along junction 50, the junction 50 may be molded with a constant or varying cross-sectional thickness along its length equal to or less than substrate thickness T. Preferably, as shown in FIG. 2, junction 50 is molded with a varying cross-sectional thickness A as created by notch 58 which is less than the substrate thickness T. Preferably, the cross-sectional thickness A of junction 50 is formed between 85% and 10% of substrate thickness T (i.e. $A \leq 0.85T$ and $A \geq 0.10T$). More preferably, the cross-sectional thickness A of junction 50 is formed at 50% of substrate thickness T (i.e. $A=0.5T$). More preferably, the cross-sectional thickness A of junction 50 is 1.25 mm and the substrate thickness is 2.5 mm. In this manner Depending on design, upon airbag deployment, junction 50 in combination with the reinforcement member 30 (discussed in greater detail below) will effect the opening characteristics of the airbag door 10. For example, junction 50 may function as a hinge, a tether, and/or an energy management device. To this end, upon airbag deployment the junction 50 may remain connected, fracture, or break. For example, if has been found that where the cross-sectional thickness A of junction 50 is less than the substrate thickness, the junction 50 may bend, fracture or break under different deployment conditions, albeit more uniformly than when the cross-sectional thickness A of the junction 50 is equal to the substrate thickness.

Figure 4:
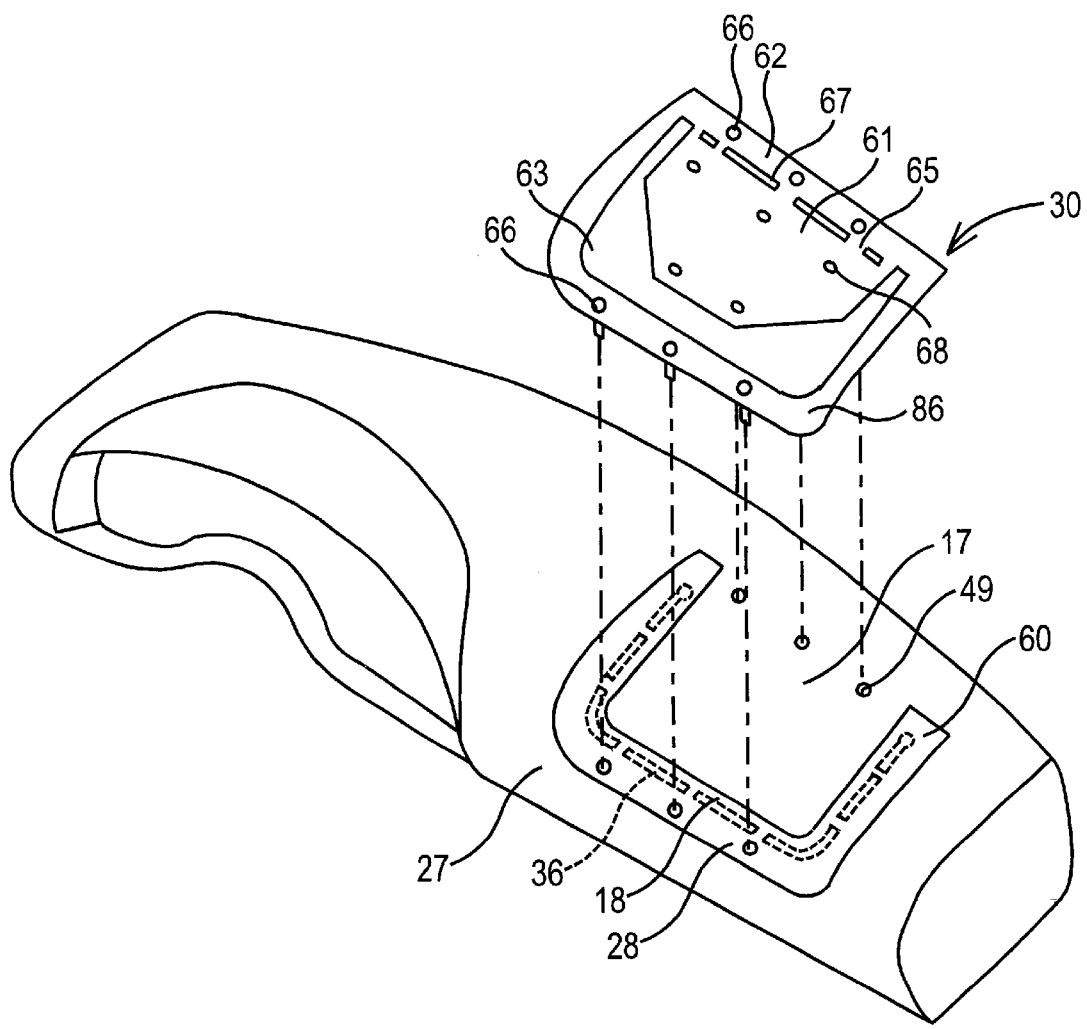
FIG. 4 is an exploded view of the substrate and reinforcement member of the airbag door system of FIG. 1.

After forming the apertures 36, preferably they are closed. As shown in FIG. 4, the apertures 36 are closed preferably via a strip layer of masking tape 60 placed over the apertures 36 and also preferably over adjacent portions of the upper surface 18 of the airbag door substrate 17 and upper surface 28 of trim member substrate 27. The tape 60 seals the apertures 36 and prevents the foam 14, subsequently joined to the upper surfaces 18, 28 of substrates 17, 27 and lower surfaces 13, 23 of the outer shell 11, 21 as discussed below, from penetrating through the apertures 36 to the lower surfaces 19, 29 of the substrates 17, 27. It is recognized that while masking tape 60 is preferred, any material capable of forming a seal may be used including, but not limited to polymer films, paper, and textiles.

In other embodiments, apertures 36 may be initially formed as closed sections during forming or molding of the substrate 8, and subsequently cut opened (e.g. with a router, laser, knife, etc.) after the foam process discussed below. In such a case, the thickness of the material overlying the apertures 36 may be formed with a cross-sectional thickness anywhere between substrate thickness T and 10% of substrate thickness T (i.e. $E \geq 0.1T$). Preferably, the thickness is on the order of 10% to 25% of the substrate thickness T to facilitate easy cutting of the substrate material and opening of the apertures while balancing against any added difficulty in molding. However, tape 60 is preferred to the use of a cutter as substrate particulate generated as a result of the cutting operation may cling to the substrates 17, 27 after the cutter's use and become fragments upon airbag deployment.

Figure 5:
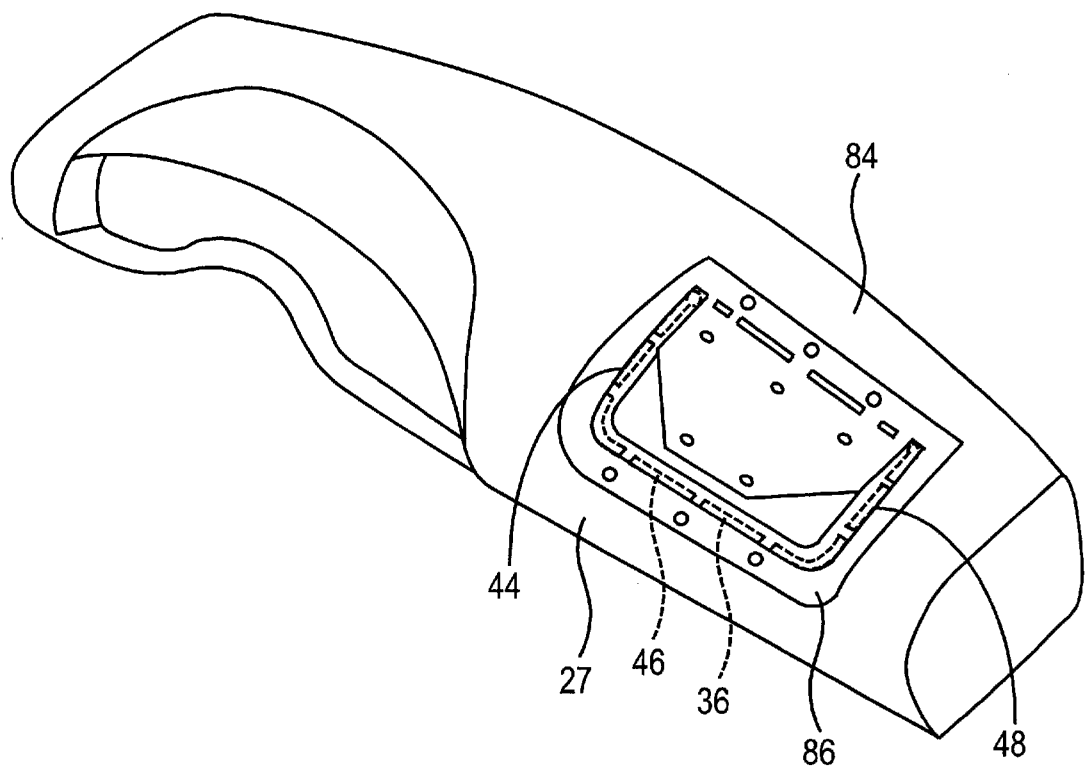
FIG. 5 is a perspective view of the substrate and reinforcement member of the airbag door system of FIG. 1.

After applying tape 60 to the apertures 36, the lower surfaces 32, 64 of a reinforcement member 30 are preferably placed on the upper surfaces 18, 28 of the substrates 17, 27 as shown in FIGS. 2 and 4. As shown in FIG. 5, portions of the reinforcement member 30 may overlap the masking tape 60 previously placed on the upper surfaces 18, 28 of the airbag door and trim member substrates 17, 27.

In the case where a polymer film is used as an alternative to tape 60, preferably, the polymer film 60a is die cut from roll or sheet stock and provided with a pressure sensitive adhesive on both sides. Unlike tape 60, rather than having a U-shape substantially similar to the pattern of apertures 36, the polymer film 60a is preferably die cut to the approximate overall dimension of the reinforcement member 30, and then first bonded to upper surfaces 18, 28 of substrates 17, 27. After application to substrates 17, 27, the lower surfaces 32, 64 of reinforcement member 30 are subsequently bonded over the remaining exposed surface of the polymer film 60a.

The use of a polymer film 60a with double sided adhesive is preferred to the use of tape 60 as the lower surfaces 32, 64 of the reinforcement member 30 are better held in place against the upper surfaces 18, 28 of substrates 17, 27 while rivets 68 discussed below are attached and expanded. Also, the adhesive bond between the lower surfaces 32, 64 of reinforcement member 30 and upper surfaces 18, 28 of substrates 17, 27 reduces, and preferably prevents, foam 14, 24 as discussed below from penetrating therebetween. Also, portions of the substrates 17, 27 which may break and subsequently fragment during airbag deployment may be better held in place and retained from entry into the vehicle occupant compartment as a result of being bonded to the polymer film 60a. Also, because of the ability of the polymer film 60a to possibly retain the entry of broken substrate portions into the vehicle occupant compartment, in certain instances the reinforcement member 30 may be eliminated from use. As an alternative to the polymer film 60a with the double sided adhesive, an adhesive without the polymer film (e.g. hot melt, spray) may also be applied between the lower surfaces 32, 64 of the reinforcement member 30 and the upper surfaces 18, 28 of substrates 17, 27 to create the adhesive bond therebetween.

Reinforcement member 30 is preferably made of metal, and more preferably steel. Other materials include, but are not limited to, aluminum, magnesium and plastics. As shown in FIG. 4, reinforcement member 30 includes an airbag door portion 61 and a trim member portion 62. The lower surface 32 of the airbag door portion 61 of reinforcement member 30 is adjacent the upper surface 18 of airbag door substrate 17. The lower surface 64 of the trim member portion 62 of reinforcement member 30 is adjacent upper surface 28 of trim member substrate 27. The airbag door portion 61 and trim member portion 62 of the reinforcement member 30 may include items such as ribbing or bosses for added stiffness.

Figure 4A:
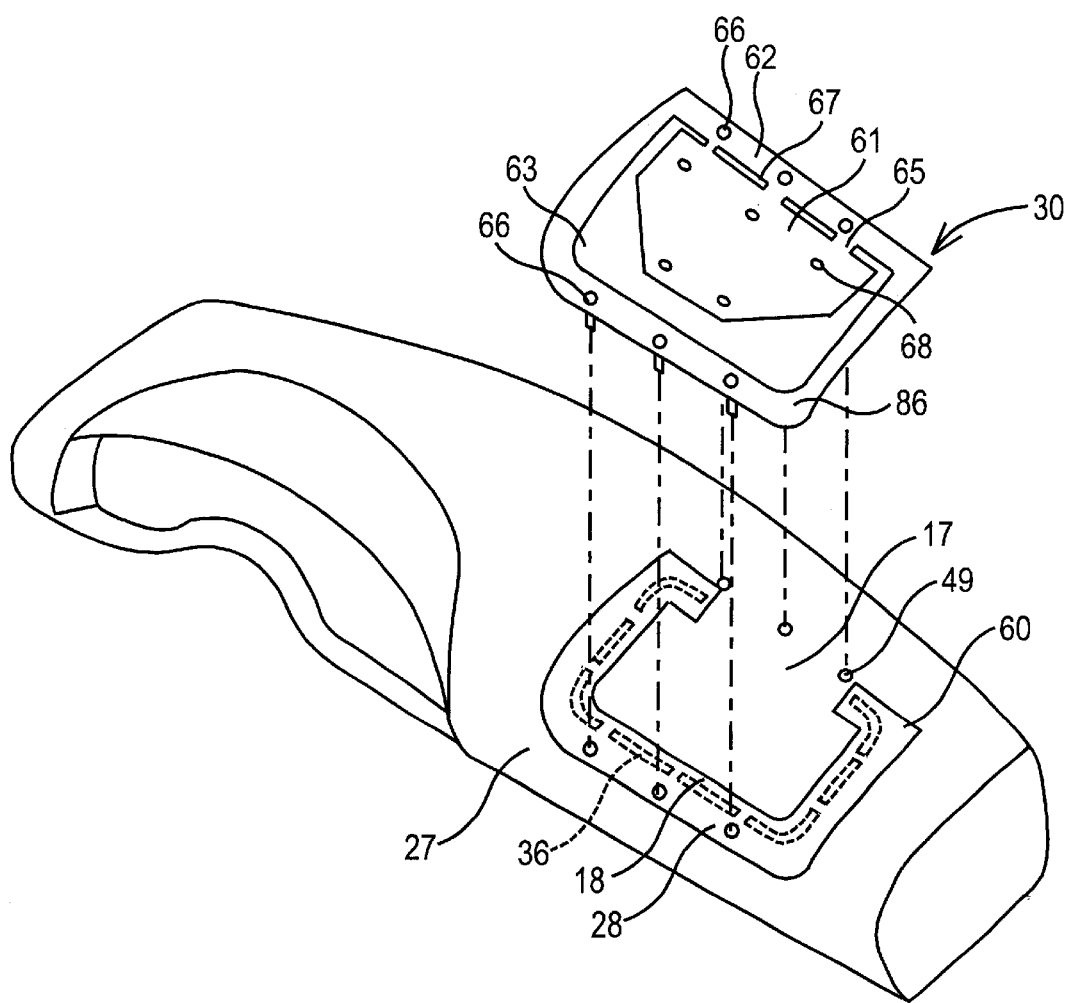
FIG. 4A is first variation of the perspective view of the substrate and reinforcement member of the airbag door system of FIG. 1.
Figure 4B:
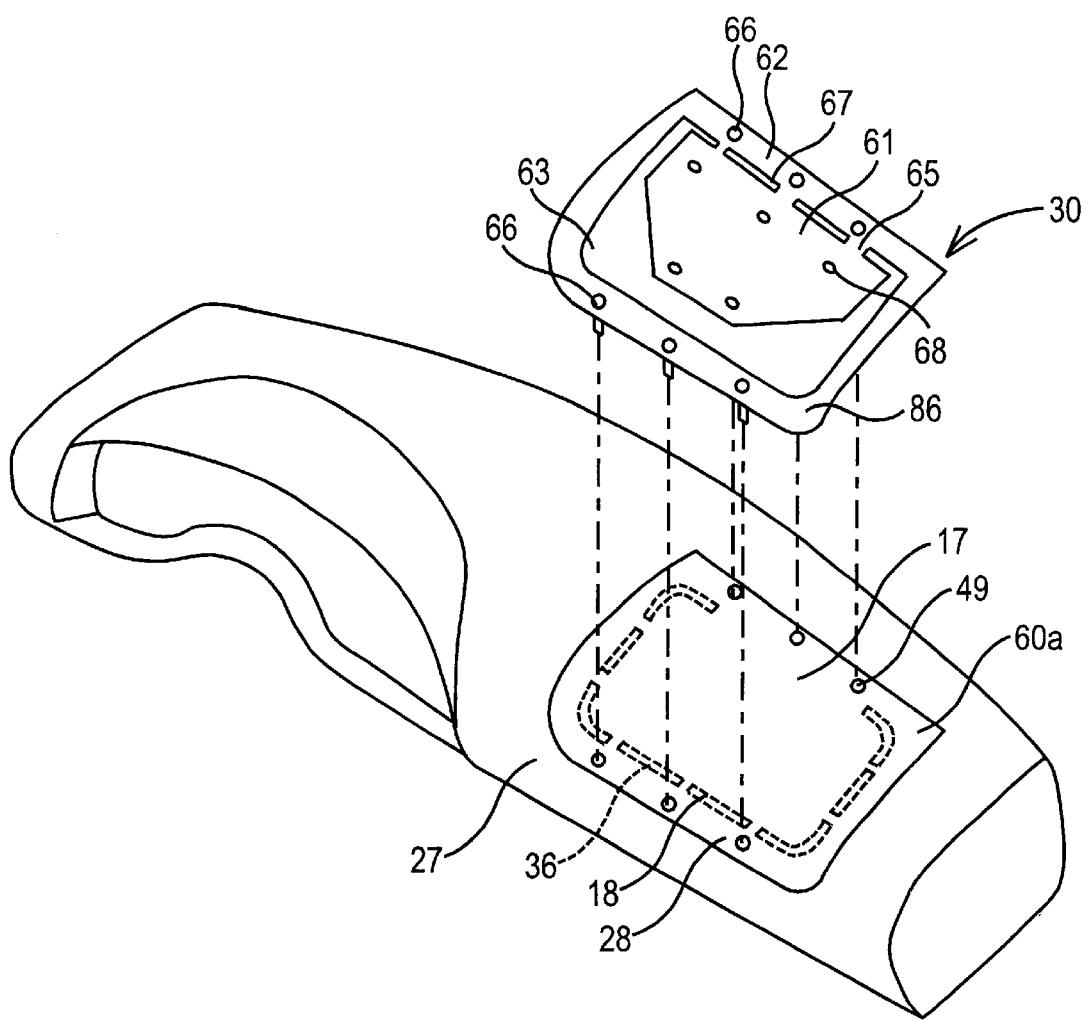
FIG. 4B is a second variation of the perspective view of the substrate and reinforcement member of the airbag door system of FIG. 1.

As shown in FIG. 4, the airbag door portion 61 and trim member portion 62 of reinforcement member 30 are completely separated on three sides by a generally U-shaped aperture 63 which defines a line of mechanical weakness in the reinforcement member 30. Preferably, aperture 63 will be at least partially overlying aperture 36 of substrate 8 as to permit a device, such as a knife, to extend through both aperture 36 of substrate 8 and aperture 63 of reinforcement member 30 and sever foam 6 as discussed below. The remaining side defining airbag door portion 61 and trim member portion 62 of reinforcement member 30 (located most forward in car position) preferably contains a plurality of apertures 67 separating airbag door portions 61 and trim member portion 62. Alternatively, as shown in FIG. 4A, aperture 63 may also define at least a portion of this side of the reinforcement member 30. Bridges 65 existing between the apertures 67 of the reinforcement member 30 are not designed to break upon airbag deployment, but rather function as a hinge, a tether, and/or an energy management device when the airbag deployment force is applied to the airbag door 10.

As shown in FIGS. 2 and 4, after locating the lower surfaces 32, 64 of the reinforcement member 30 on the upper surfaces 18, 28 of the substrates 17, 27, preferably five rivets 68 directed through airbag door substrate 17 from lower surface 19 and pierce through airbag door substrate 17 and partially into airbag door portion 61 of reinforcement member 30. However, alternatively, the rivets 68 may pierce completely through airbag door portion 61 of reinforcement member 30, or may be directed from the upper surface 31 of the reinforcement member 30. The rivets 68 are subsequently expanded to attach reinforcement member 30 to substrate 17. The combination of reinforcement member 30 with substrates 17, 27 comprises reinforcement member/ substrate subassembly 84. While not preferably in terms of added weight and cost due to material redundancy, it has been found that the double material layer created with airbag door substrate 17 and airbag door portion 61 of reinforcement member 30 in combination is preferred during airbag deployment for added stiffness as discussed above, rather than either the airbag door substrate 17 or the airbag door portion 61 of the reinforcement member 30 used individually.

Preferably, the trim member portion 62 of reinforcement member 30 comprises a ring 86 as shown in FIG. 4 and more preferably a closed ring. In the trim member portion 62 of the reinforcement member 30, the reinforcement member 30 preferably contains six bolts 66 welded thereto and protruding from the lower surface 64 thereof. The six bolts 66 are welded in a pattern in which three of the bolts 66 are spaced along the side of the reinforcement member 30 most forward in car position, while the remaining three bolts 66 are spaced along the side of the reinforcement member 30 most rearward in car position. However, while not shown, additional bolts 66 may be located on either or both of the two remaining sides of the ring 86 of reinforcement member 30, or the existing bolts 66 may be merely moved to the two remaining sides leaving the sides of the reinforcement member most forward and rearward in car position without bolts 66. All six bolts 66 coincide with holes 49 formed in the trim member substrate 27, and extend through the substrate 27 upon attachment of airbag door portion 61 of reinforcement member 30 to airbag door substrate 17 as discussed above. The bolts 66 are used to attached the airbag canister housing 34 discussed below.

As can be seen from FIGS. 2 and 5, preferably at least a portion of ring 86 overlies trim member substrate 27 along sides 44, 46, and 48 to the edge of apertures 36. More preferably, the whole ring 86 substantially, and preferably completely, overlies trim member substrate 27 along sides 44, 46, and 48 to the edge of apertures 36. In this manner, sides 44, 46, and 48 of trim member substrate 27, which may break and subsequently fragment during airbag deployment, may be better held in place and retained by ring 86 from entry into the vehicle occupant compartment.

The outer shell 4 is preferably formed via slush molding at a thickness of 1.0 mm. Preferably, the slush molding operation involves casting the shell material in a dry powder or bead form against a heated nickel electro-formed mold in a manner known in the art. Typical processes may include those described in U.S. Pat. Nos. 4,623,503; 5,445,510; 5,654,102; and 5,824,738 assigned to the assignee of the present invention, and incorporated herein by reference. The shell material preferably comprises a polyvinyl chloride (PVC) material, though any suitable material may be used. These material include, but are not limited to plastics (e.g. polyurethanes, polyolefins, and polyesters), leather, and textiles. Alternatively, the outer shell 6 may be formed by vacuum forming, thermoforming, spraying, blow molding, injection molding.

Figure 12:
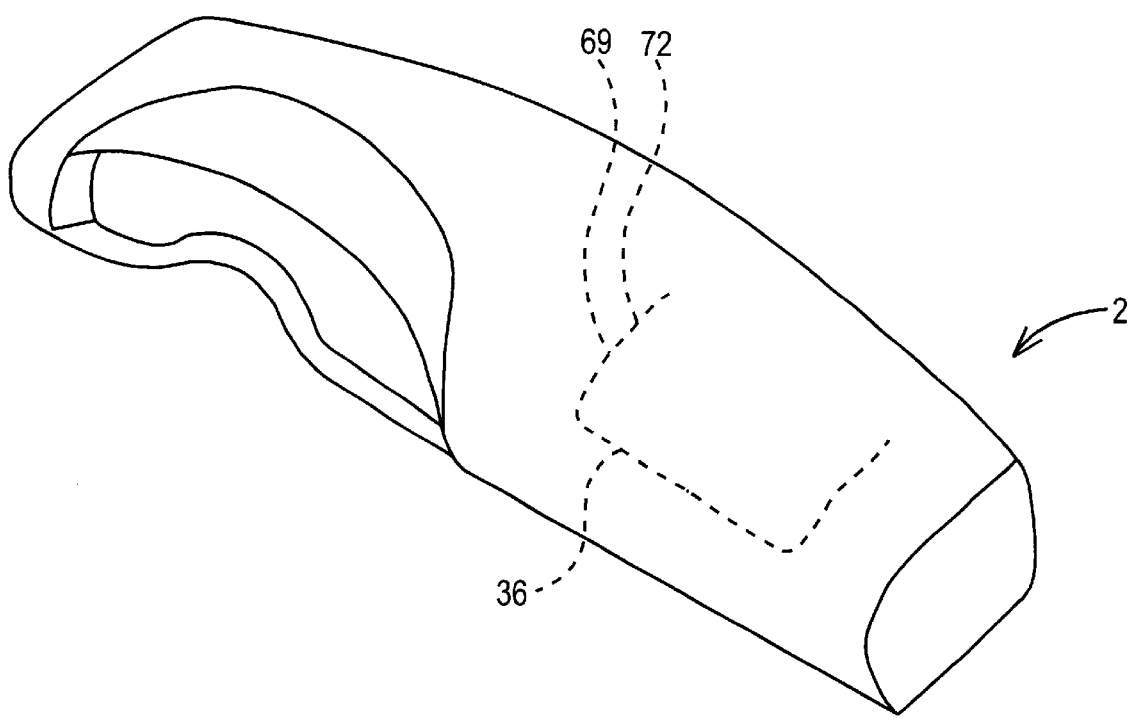
FIG. 12 is a perspective view of the cross-sectional enlargement view of FIG. 11.
Figure 14:
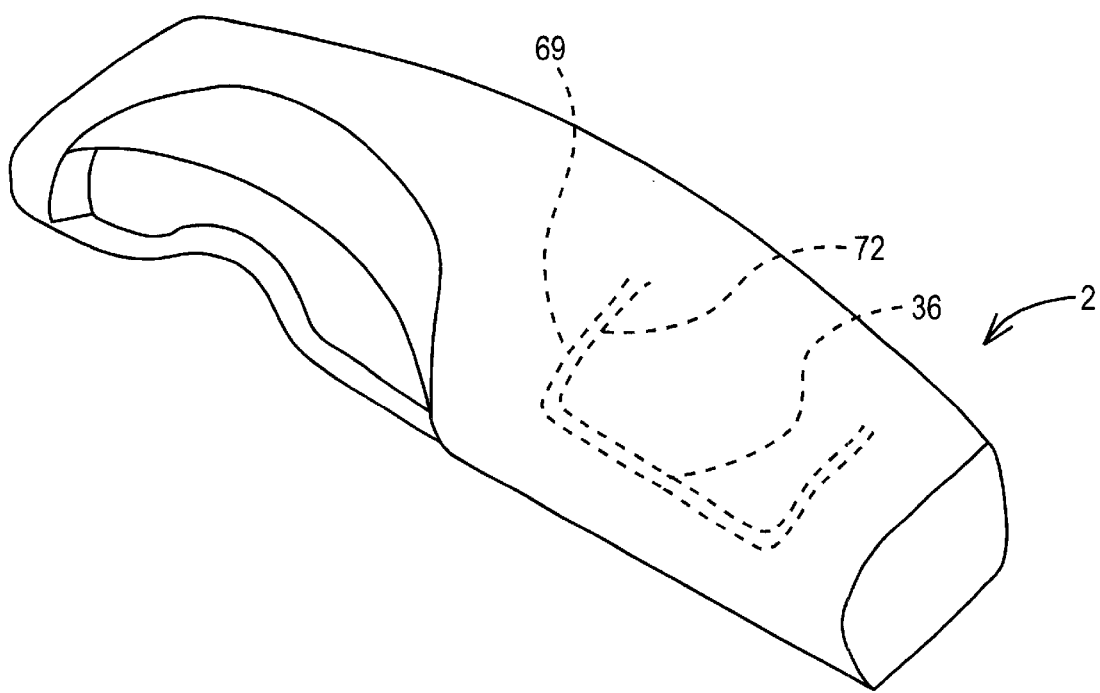
FIG. 14 is a perspective view of the cross-sectional enlargement view of FIG. 13.
Figure 15:
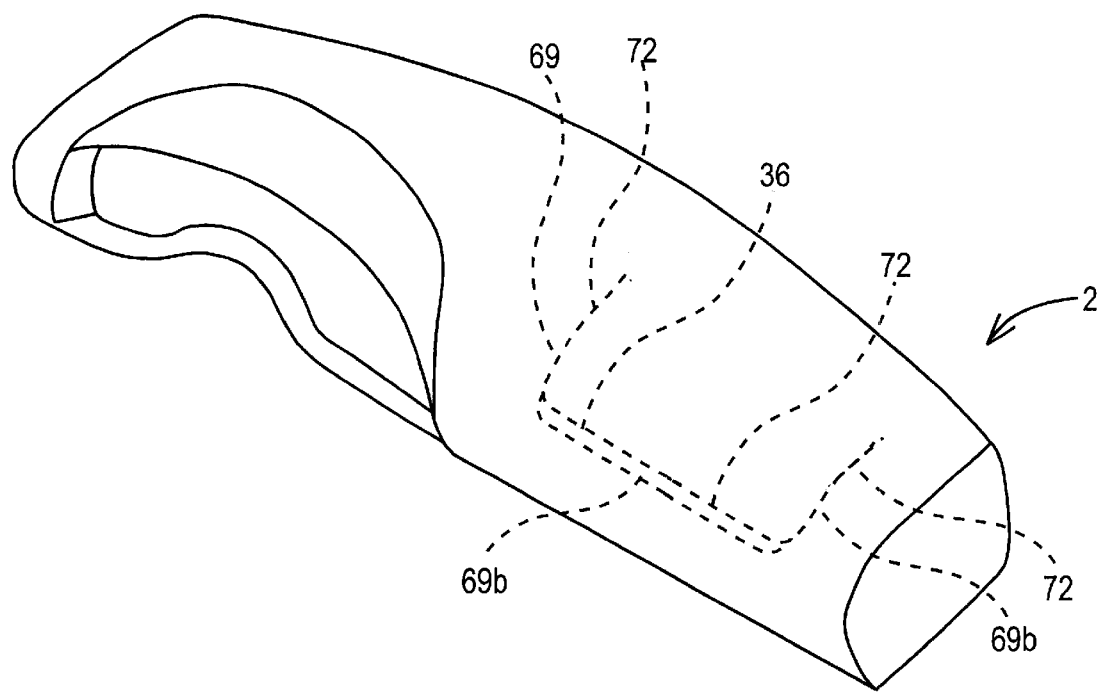
FIG. 15 is a perspective view of a third embodiment.

Once the outer shell 6 is formed, it is removed from the nickel electro-formed mold. Preferably, a portion of the shell's thickness is then severed from the shell's lower surface extending towards the upper surface to define a line of mechanical weakness in the shell 4. In a first embodiment, as shown in FIGS. 11 and 12, the shell sever 69 and apertures 36 at least partially overlie (as shown in FIG. 11 they completely overlie) one another for at least a portion of their lengths (as shown in FIG. 12 for their complete lengths) defining the airbag door 10 and trim member 20. In a second embodiment, such as shown in FIG. 15, shell sever 69 and apertures 36 are off-set from one another for at least a portion of their lengths defining the airbag door 10 and trim member 20. In a third embodiment, such as shown in FIG. 14 and preferred, shell sever 69 and apertures 36 are off-set from one another for their complete lengths defining the airbag door 10 and trim member 20.

With a shell thickness of 1.0 mm, the depth of the shell sever 69 preferably ranges from 0.2 mm to 0.8 mm (i.e. 20% to 80% of the shell's thickness), in which case the unsevered thickness of the shell ranges from 0.8 mm to 0.2 mm (i.e 80% to 20% of the shell's thickness). More preferably, with a shell thickness of 1.0 mm, the depth of the sever 69 preferably ranges from 0.4 mm to 0.5 mm (i.e. 40% to 50% of the shell's thickness), in which case the unsevered thickness of the shell ranges from 0.6 mm to 0.5 mm (i.e. 60% to 50% of the shells's thickness). However, while the depth of the shell sever 69 may be preferred to exist between 20% to 80% of the shell's thickness, it is recognized that the depth of the shell sever 69 may range anywhere between 5% and 95% of the shell's thickness depending on the thickness and material used. With regards to measuring outer shell thickness, where the outer shell thickness is uniform the outer shell thickness is typically equal to the nominal outer shell thickness. Alternatively, where the outer shell thickness may vary throughout the outer shell, the outer shell thickness is preferably measured in an area of the outer shell adjacent shell sever 69.

It is recognized that the line of mechanical weakness in the shell 6 as a result of shell sever is preferably continuous, but may also be discontinuous such as represented by a plurality of holes, either through holes or blind holes, such as those disclosed in U.S. Pat. Nos. 5,632,914 and 5,961,143 assigned to the assignee of the present invention, and incorporated herein by reference. Further, it is recognized that the line of mechanical weakness need not necessarily be achieved with a reduced cross-sectional thickness in comparison to the wall thickness, and as such other processes for creating the line of mechanical weakness may be employed such as those disclosed in U.S. Pat. Nos. 5,288,103; 5,466, 412; 5,484,273; 5,530,057, 5,567,375; 5,580,083; and WO 97/17233 assigned to the assignee of the present invention, and incorporated herein by reference. Still other processes for creating a line of mechanical weakness such as those disclosed in U.S. Pat. Nos. 5,131,678; 5,256,354; 5,443,777; 5,447,328; and 5,501,890 assigned to the assignee of the present invention, and incorporated herein by reference.

As shown in FIG. 11, the shell sever 69 is preferably formed perpendicular to the lower surfaces 13, 23 of outer shell 11, 21. However, as shown in FIG. 16, shell sever 69 may be formed at an angle other than perpendicular to either or both of the surfaces 13, 23. With regards to determining whether shell sever 69 is formed at an angle perpendicular or other than perpendicular to surfaces 13, 23, the angle is preferably measured with respect to the outer shell adjacent shell sever 69.

Shell sever 69 is preferably created using a severing device such a cutting die, or more preferably, a knife mounted to the arm of a computer controlled robot. The knife may be heated above ambient temperature and/or use ultrasonic frequency. Preferably, the knife blade is thin enough, about 0.5 mm, to make shell sever 69 extremely narrow. More preferably, shell sever 69 is sufficiently narrow such that surfaces 70 and 71 created as a result of the shell sever 69 will make contact with one another after shell sever 69 is created. However, alternatively, surfaces 70 and 71 may be sufficiently separated by shell sever 69 such that they will not make contact with one another after shell sever 69 is created. Preferably, the unsevered thickness of the shell is to be controlled as opposed to the depth of the sever. Consequently, the sever may actually vary in depth over the course of its length where the thickness of the shell varies.

As indicated above, preferably shell sever 69 is sufficiently narrow such that surfaces 70 and 71 created as a result of the shell sever 69 will make contact with one another after shell sever 69 is created. Surfaces 70 and 71 of shell sever 69 preferably make contact with one another after shell sever 69 is created such that foam 6 applied directly adjacent to the shell sever 69 does not completely fill shell sever 69, and more preferably does not enter or fill any portion of shell sever 69, as a result of the foam forming process. The reduction, and preferably elimination, of foam 6 from entering between the surfaces 70, 71 of shell sever 69 and the resultant partial existence (i.e. does not completely exist), and preferably nonexistence (i.e. does not exist) of foam between the surface 70 and surface 71 of shell sever 69 (as opposed to completely filling or completely existing between surface 70 and surface 71) has been found to reduce, and in some cases eliminate, the existence of "read through" (i.e. detection) of the airbag door by a vehicle occupant prior to deployment. Thus, generally a reduction in foam 6 from entering the shell sever 69 as a result of the foam forming process and the corresponding reduction of foam 6 from entering between surface 70 and surface 71 of shell sever 69 results in a lower possibility of "read through" after the foam forming process. However, alternatively, it is recognized the foam 6 may exist between surfaces 70 and 71 of shell sever 69 as a result of the foam forming process.

It is noted that foam 6 may also be reduced from entering the shell sever 69 such by the use of a separate sealing device other than the outer shell 4 itself, such as applying tape to lower surfaces 13, 23 of outer shell 11, 21 and spanning the sever 69 prior to the foam forming process. However, it has been found that use of tape most often results in "read through" at the perimeter edge of the tape as a result of foam 6 bonding to the tape in a manner different than to that of the lower surfaces of the shell. To the contrary, the invention uses only the outer shell 4 itself as a sealing device to reduce, and preferably eliminate, foam 6 from enter shell sever 69.

Once the reinforcement member/substrate subassembly 84 and shell 11, 21 are formed, they are then preferably joined via formation of the foam 24. In an open mold, the mold receives both the shell layer and member/substrate subassembly 84. The lower surface of the shell layer 13, 23 and upper surfaces 18, 28, 31, and 89 of the reinforcement member/substrate subassembly 84 are held from one another in fixed, spaced relation. Preferably, a reactable urethane foam precursor is then poured or injected into the space between the shell and member/substrate subassembly and the mold closed. Preferably, the thickness of the foam is 4.0 mm to 15.0 mm, and more preferably 8.0 mm to 12.0 mm. After the foam layer has cured, the mold is opened and the trim member 20 removed from the mold.

After forming the foam 6, a portion of the foam's thickness is then severed from the foam's lower surface extending towards the upper surface to define a line of mechanical weakness in the foam 6. In a first embodiment, as shown in FIGS. 11 and 12, the foam sever 72 and shell sever 69 at least partially overlie (as shown in FIG. 11 they completely overlie) one another for at least a portion of either lengths (as shown in FIG. 12 for their complete lengths) defining the airbag door 10 and trim member 20. In a second embodiment, such as shown in FIG. 15, foam sever 72 and shell sever 69 are off-set from one another for at least a portion of their lengths defining the airbag door 10 and trim member 20. In a third embodiment, such as shown in FIG. 14 and preferred, foam sever 72 and shell sever 69 are off-set from one another for their complete lengths defining the airbag door 10 and trim member 20. In certain instances, the third embodiment has been found to reduce foam fragmentation upon deployment relative to the first embodiment and thus preferable. In the first embodiment, upon airbag deployment foam tear proceeds in a substantially parallel fashion to foam sever 72. However, with the second and third embodiments, upon airbag deployment foam tear proceeds at an angle other than substantially parallel to foam sever 72.

With respect to foam 6 and substrate 8, as shown in FIGS. 11 and 12, foam sever 72 and apertures 36 preferably at least partially overlie (as shown in FIG. 11 they completely overlie) one another for at least a portion of either lengths (as shown in FIG. 12 for their complete lengths) defining the airbag door 10 and trim member 20. While not shown, it is recognized that foam sever 72 and apertures 36 may be off-set from one another for at least a portion of their lengths or their complete lengths defining the airbag door 10 and trim member 20.

Figure 13:
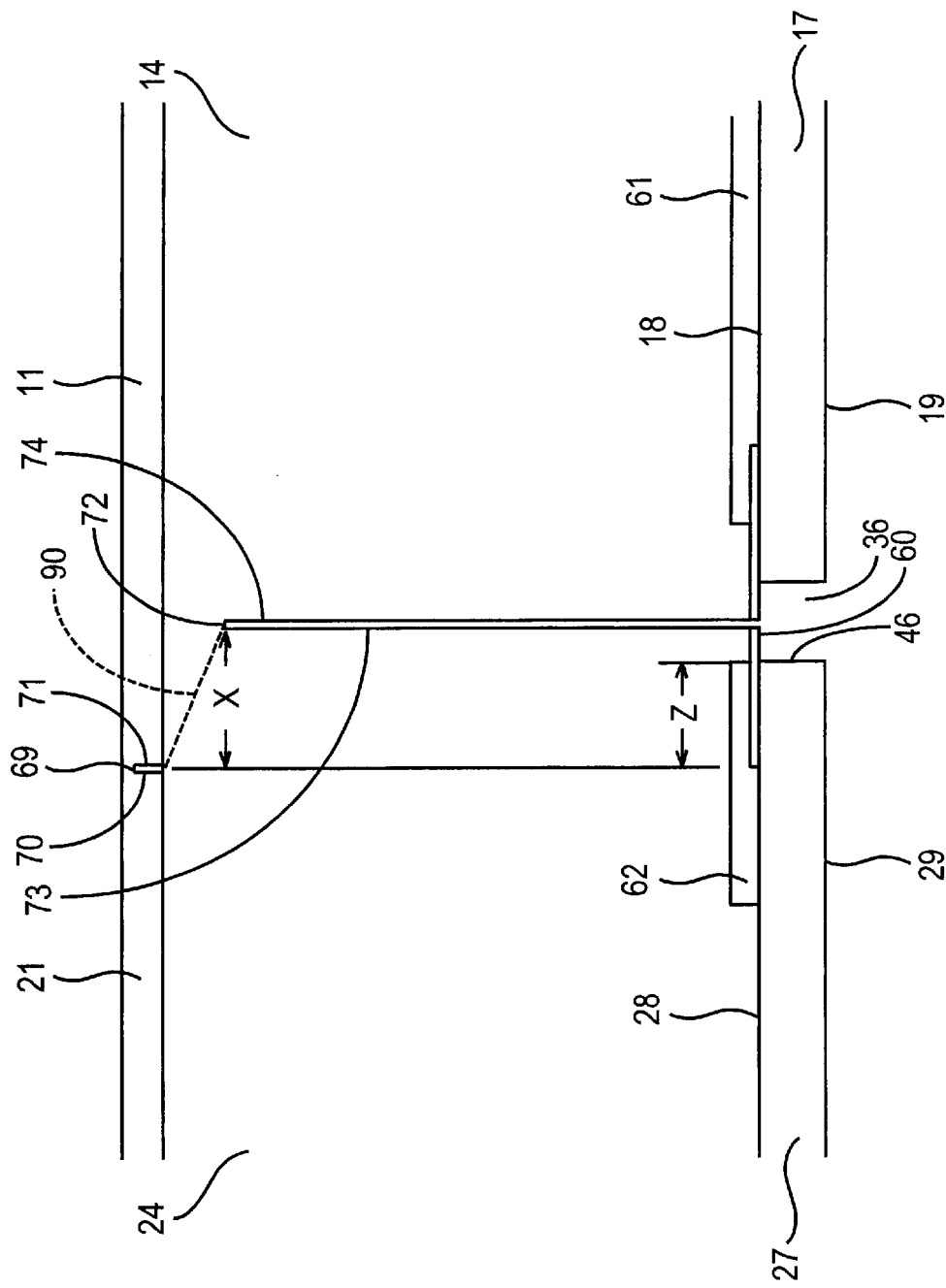
FIG. 13 is a cross-sectional enlargement view of a second embodiment.

As shown in FIG. 13, foam sever 72 and apertures 36 preferably overlie one another for at least a portion of their lengths defining the airbag door 10 and trim member 20, while foam sever 72 and shell sever 69 are preferably off-set from one another for at least a portion of their lengths defining the airbag door 10 and trim member 20. Preferably, the shell sever 69 and foam sever 72 are off-set from one another such that resulting outer shell 11 of airbag door 10 overhangs or is larger than the surface area of foam 14 of airbag door 10 prior to deployment. In determining whether an off-set between two lines of mechanical weakness exists, as well as its magnitude, the distance of the off-set is measured laterally between where the respective lines of mechanical weakness begin relative to one another. If the value is greater than zero, an off-set exists and its magnitude is the lateral distance as measured. For example, in FIG. 13, relative to foam sever 72 and shell sever 69, foam sever 72 begins at surface 73 and shell ever 69 begins at surface 71. The lateral distance X measured between surfaces 73 and 71 is the off-set distance between shell sever 69 and foam sever 72. For a second example, in FIG. 13, relative to apertures 36 and shell sever 69, aperture begins at surface 46 and shell sever 69 begins at surface 71. The lateral distance Z measured between surface 46 and 71 is the off-set distance between apertures 36 and shell sever 69.

In the instance of lines of mechanical weakness formed other than perpendicular to their surfaces, in FIG. 16 the lateral distance X' measured between the beginning of surfaces 73 and 71 is the off-set distance between shell sever 69 and foam sever 72. Also as shown in FIG. 16, the lateral distance Z' measured between the beginning of surfaces 46 and 71 is the off-set distance between apertures 36 and shell sever 69.

In terms of magnitude, preferably, the foam sever 72 and shell sever 69 are laterally off-set by an amount suitable to preferably achieve both a horizontal and vertical severing vector of the tear pathway created in the foam, such tear pathway propagating towards the line of mechanical weakness in the outer skin. In other words, by such lateral offset, the tear pathway 90 above the foam sever has both an upward vector component and a horizontal vector component in its tearing profile, i.e., the tear pathway moves upward and horizontally at the same time.

Preferably, in terms of specific dimensions, this offset is equal to or greater than 1.0 mm, more preferably, by amounts equal to or greater than, e.g., 1.1 mm, 1.2 mm, etc., up to an amount of 50 mm in 0.1 mm increments. Accordingly, offset values are preferably between 1.0 mm to 50.0 mm, at any 0.1 mm increment therebetween. Most preferably, offset values are preferably between the range of about 5.0 mm to 15.0 mm. A most preferred offset value is 10.0 mm. In addition, shell sever is outboard of the foam sever.

Preferably, the foam sever 72 does not extend to the lower surface of the shell layer, but rather leaves a 0.5 mm to 3.5 mm thick unsevered section of foam between the end of the foam sever 72 and lower surface of the shell. This unsevered section of foam helps to prevent "read through" of the airbag door by a vehicle occupant prior to deployment. In terms of a percentage range, a foam thickness of 15.0 mm and a sever depth of 14.5 mm results in a sever of 96.7% of the foam's thickness, in which case the unsevered thickness is 3.3% of the foam's thickness. On the other end of the scale, a foam thickness of 4.0 mm and a sever depth of 0.5 mm results in a sever of 12.5% of the foam's thickness, in which case the unsevered thickness is 87.5% of the foam's thickness. However, it is recognized while not preferred that the foam's thickness may be completely severed.

More preferably, the unsevered thickness of the foam 6 ranges between 1.0 mm and 3.0 mm, and more preferably is 2.0 mm. In which case, with a preferred foam thickness of 8.0 mm to 12.0 mm, the severed depth preferably ranges between 62.5% to 91.7% of the foam's thickness, and more preferably ranges between 75% and 83.3% of the foam's thickness. With regards to measuring foam thickness, where the foam thickness is uniform the foam thickness is typically equal to the nominal foam thickness. Alternatively, where the foam thickness may vary throughout the foam layer, the foam thickness is preferably measured in an area of the foam adjacent foam sever 72.

The foam 6 is preferably severed by a knife extending through apertures 36 and masking tape 60 from the lower surfaces 19, 29 of the substrates 17, 27. Thus, unlike the shell sever 69 which is preferably continuous, the foam sever 72 is preferably a discontinuous plurality of slots, as the foam beneath bridges 56 remains unsevered. However, it is recognized that the foam sever 72 may be continuous as in the case in which one aperture 36 is used and bridges 65 do not exist.

As shown in FIG. 2, the foam sever 72 is preferably formed perpendicular to the lower surfaces 16, 26 of foam 14, 24. However, as shown in FIG. 16, foam sever 69 may be formed at an angle other than perpendicular to either or both of the surfaces 16, 26. With regards to determining whether foam sever 72 is formed at an angle perpendicular or other than perpendicular to surfaces 16, 26, the angle is preferably measured with respect to the foam adjacent foam sever 72.

As with the shell, foam sever 72 is preferably created using a knife mounted to the arm of a computer controlled robot. The knife may be heated above ambient temperature and/or use ultrasonic frequency. Preferably, the knife is thin enough, about 0.5 mm, to make foam sever 72 extremely narrow. More preferably, foam sever 72 is sufficiently narrow such that surfaces 73 and 74 created as a result of the foam sever 72 will make contact with one another after foam sever 72 is created. The resultant contact between surfaces 73 and 74 after foam sever 72 is created helps to reduce "read through" of the airbag door by a vehicle occupant prior to deployment. While not being bound by a particular theory, it is believed that "read through" is reduced as a result of the friction created between the two surfaces in contact, and the resulting reduction in the two surfaces moving independent relative to one another as a result of the friction. However, alternatively, surfaces 73 and 74 may be sufficiently separated by foam sever 72 such that they will not make contact with one another after foam sever 72 is created. Preferably, the unsevered thickness of the foam is to be controlled as opposed to the depth of the sever. Consequently, the sever may actually vary in depth over the course of its length where the thickness of the foam varies.

After weakening the foam 6 the upper surface 76 of an airbag canister housing 34 is preferably placed on the lower surface 29 of trim member substrate 27. In airbag canister housing 34 preferably contains six holes 78 which coincides with the six bolts 66 welded to the reinforcement member 30 and protruding through the six holes 49 in the trim member substrate 27. Upon locating the upper surface 76 of the airbag canister housing 34 with the lower surface 29 of the trim member substrate 27, the six bolts 66 welded to the reinforcement member 30 preferably extend through holes 49 in the trim member substrate 27 and then through holes 78 in the airbag canister housing 34. Preferably, the airbag canister housing 34 is joined to the member/substrate subassembly 84 by the use of six nuts 80 which attach to the six bolts 66 of the reinforcement member 30.

As can be seen from FIG. 2, similar to ring 86 of reinforcement member 30 preferably the airbag canister housing 34 substantially, and preferably completely, underlies trim member substrate 27 along sides 44, 46, and 48 to the edge of apertures 36. In this manner, sides 44, 46, and 48 of trim member substrate 27, which may break and subsequently fragment during airbag deployment, may be sandwiched between the ring 86 the reinforcement member 30 and the airbag canister housing 34 and retained from entry into the vehicle occupant compartment.

In addition to joining the airbag canister housing 34 to the member/substrate subassembly 84 by the use of six nuts 80 which attach to the six bolts 66 of the reinforcement member 30, an adhesive 88 may be located between the upper surface 76 of the airbag canister housing 34 and the lower surface 29 of the trim member substrate 27 to create an adhesive bond therebetween. The adhesive 88 may be used alone or, preferably, in combination with mechanical fasteners such as bolts 66 and nuts 80.

The adhesive 88 is particularly useful between the upper surface 76 of the airbag canister housing 34 and the lower surface 29 of the trim member substrate 27 adjacent junction 50. In this manner, similar to where junction 50 functions more uniformly when cross-sectional thickness A is less than the substrate thickness, adhesive 88 also promotes a more uniform operation of junction 50. In other words, junction 50 tends to bend, fracture or break more uniformly when adhesive 88 is used adjacent thereto between the upper surface 76 of the airbag canister housing 34 and the lower surface 29 of the trim member substrate 27 rather than in its absence. Also, portions of the trim member substrate 27 which may break and subsequently fragment during airbag deployment may be better held in place and retained from entry into the vehicle occupant compartment as a result of being bonded to the adhesive 88.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims.

What is claimed is:

1. An airbag door system having an airbag door portion and a trim member portion, said airbag door system comprising:

a substrate comprising a substrate upper surface, a substrate lower surface, a substrate thickness and a substrate line or mechanical weakness, said substrate line of mechanical weakness comprising at least one substrate aperture at least partially separating said substrate into an airbag door substrate portion and a trim member substrate portion;

an outer shell comprising an outer shell upper surface, an outer shell lower surface, an outer shell thickness and an outer shell line of mechanical weakness, said outer shell line of mechanical weakness comprising an outer shell reduced thickness portion defined by an outer shell sever extending partially through said outer shell thickness from said outer shell lower surface towards said outer shell upper surface, said outer shell line of mechanical weakness at least partially separating said outer shell into an airbag door outer shell portion and a trim member outer shell portion;

a foam disposed between said substrate and said outer shell, said foam comprising a foam upper surface, a foam lower surface, a foam thickness and a foam line of mechanical weakness, said foam line of mechanical weakness comprising a foam reduced thickness portion defined by a foam sever extending partially through said foam thickness from said foam lower surface towards said foam upper surface, said foam line of mechanical weakness at least partially separating said foam into an airbag door foam portion and a trim member foam portion;

said outer shell line of mechanical weakness comprising a line of mechanical weakness being laterally displaced by at least 3.0 millimeter relative to said foam line of mechanical weakness or substrate line of mechanical weakness; and a reinforcement member, said reinforcement member having a reinforcement member upper surface, a reinforcement member lower surface, a reinforcement member thickness, and a reinforcement member line of mechanical weakness, said reinforcement member line of mechanical weakness comprising at least one reinforcement member aperture at least partially separating said reinforcement member into an airbag door reinforcement member portion and trim member reinforcement member portion.

2. The airbag door system of claim 1 wherein at least a portion of said airbag door reinforcement member portion overlies at least a portion of said airbag door substrate portion to create a double material layer comprising a stiffness greater than said airbag door reinforcement member portion or said airbag door substrate portion individually.

3. The airbag door system of claim 1 wherein at least a portion of said reinforcement member aperture and at least a portion of said substrate aperture overlie.

4. The airbag door system of claim 1 wherein at least a portion of said trim member reinforcement member portion overlies at least a portion of said trim member substrate portion to an edge of said trim member substrate portion adjacent said substrate aperture.

5. The airbag door system of claim 1 wherein the trim member reinforcement member portion comprises a ring.

6. The airbag door system of claim 1 wherein the trim member reinforcement member portion comprises a closed ring.

7. The airbag door system of claim 1 wherein at least a portion of said reinforcement member lower surface and said substrate upper surface are separated by tape.

8. The airbag door system of claim 1 wherein at least a portion of said reinforcement member lower surface and said substrate upper surface are separated by a polymer film.

9. The airbag door system of claim 8 wherein said polymer film further comprises two surfaces and an adhesive applied to both of said surfaces, said adhesive bonding said reinforcement member lower surface to said substrate upper surface.

10. The airbag door system of claim 1 wherein at least a portion of said reinforcement member lower surface and said substrate upper surface are adhesively bonded.

11. The airbag door system of claim 1 further comprising an airbag canister housing, said airbag canister housing having an airbag housing upper surface which underlies at least a portion of said trim member substrate portion.

12. The airbag door system of claim 11 wherein at least a portion of said airbag canister housing upper surface and said substrate lower surface are adhesively bonded.

13. An airbag door system having an airbag door portion and a trim member portion, said airbag door system comprising:
a substrate comprising a substrate upper surface, a substrate lower surface, a substrate thickness and a substrate line of mechanical weakness, said substrate line of mechanical weakness comprising at least one substrate aperture at least partially separating said substrate into an airbag door substrate portion and a trim member substrate portion;
an outer shell comprising an outer shell upper surface, an outer shell lower surface, an outer shell thickness and an outer shell line of mechanical weakness, said outer shell line of mechanical weakness comprising an outer shell reduced thickness portion defined by an outer shell sever extending partially through said outer shell thickness from said outer shell lower surface towards said outer shell upper surface, said outer shell line of mechanical weakness at least partially separating said outer shell into an airbag door outer shell portion and a trim member outer shell portion;
a foam disposed between said substrate and said outer shell, said foam comprising a foam upper surface, a foam lower surface, a foam thickness and a foam line of mechanical weakness, said foam line of mechanical weakness comprising a foam reduced thickness portion defined by a foam sever extending partially through said foam thickness from said foam lower surface towards said foam upper surface, said foam line of mechanical weakness at least partially separating said foam into an airbag door foam portion and a trim member foam portion;
said outer shell sever at said outer shell lower surface in direct contact with said foam upper surface; and
a reinforcement member, said reinforcement member having a reinforcement member upper surface, a reinforcement member lower surface, a reinforcement member thickness, and a reinforcement member line of mechanical weakness, said reinforcement member line of mechanical weakness comprising at least one reinforcement member aperture at least partially separating said reinforcement member into an airbag door reinforcement member portion and trim member reinforcement member portion.

14. The airbag door system of claim 13 wherein at least a portion of said airbag door reinforcement member portion overlies at least a portion of said airbag door substrate portion to create a double material layer comprising a stiffness greater than said airbag door reinforcement member portion or said airbag door substrate portion individually.

15. The airbag door system of claim 13 wherein at least a portion of said reinforcement member aperture and at least a portion of said substrate aperture overlie.

16. The airbag door system of claim 13 wherein at least a portion of said trim member reinforcement member portion overlies at least a portion of said trim member substrate portion to an edge of said trim member substrate portion adjacent said substrate aperture.

17. The airbag door system of claim 13 wherein the trim member reinforcement member portion comprises a ring.

18. The airbag door system of claim 13 wherein the trim member reinforcement member portion comprises a closed ring.

19. The airbag door system of claim 13 wherein at least a portion of said reinforcement member lower surface and said substrate upper surface are separated by tape.

20. The airbag door system of claim 13 wherein at least a portion of said reinforcement member lower surface and said substrate upper surface are separated by a polymer film.

21. The airbag door system of claim 20 wherein said polymer film further comprises two surfaces and an adhesive applied to both of said surfaces, said adhesive bonding said reinforcement member lower surface to said substrate upper surface.

22. The airbag door system of claim 13 wherein at least a portion of said reinforcement member lower surface and said substrate upper surface arc adhesively bonded.

23. The airbag door system of claim 13 further comprising an airbag canister housing, said airbag housing having an airbag canister upper surface which underlies at least a portion of said trim member substrate portion.

24. The airbag door system of claim 23 wherein at least a portion of said airbag canister housing upper surface and said substrate lower surface are adhesively bonded.

* * * * *